US007847872B2

(12) United States Patent
Kim

(10) Patent No.: US 7,847,872 B2
(45) Date of Patent: Dec. 7, 2010

(54) LIQUID CRYSTAL DISPLAY AND TEST METHOD THEREOF

(75) Inventor: Dong-Gyu Kim, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 12/710,449

(22) Filed: Feb. 23, 2010

(65) Prior Publication Data

US 2010/0213969 A1 Aug. 26, 2010

Related U.S. Application Data

(62) Division of application No. 11/359,955, filed on Feb. 22, 2006, now Pat. No. 7,705,924.

(30) Foreign Application Priority Data

Feb. 22, 2005 (KR) ...................... 10-2005-0014578
Jun. 2, 2005 (KR) ...................... 10-2005-0047262

(51) Int. Cl.
*G02F 1/1333* (2006.01)

(52) U.S. Cl. ............................ 349/40; 324/770; 349/54

(58) Field of Classification Search ................... 349/40; 324/770

See application file for complete search history.

(56) References Cited

U.S. PATENT DOCUMENTS

| | | | |
|---|---|---|---|
| 6,839,121 | B2 | 1/2005 | Kim et al. |
| 2001/0045997 | A1 | 11/2001 | Kim |

FOREIGN PATENT DOCUMENTS

| | | |
|---|---|---|
| CN | 1453615 | 11/2003 |
| CN | 1495498 | 5/2004 |

*Primary Examiner*—Richard H Kim
(74) *Attorney, Agent, or Firm*—Cantor Colburn LLP

(57) ABSTRACT

A liquid crystal display includes a plurality of pixel electrodes arranged in a matrix and having first and second sub-pixel electrodes differentiated in size from each other. First and second switching elements are connected to the first and second sub-pixel electrodes, respectively. First and second gate lines are connected to the first and second switching elements, respectively. A data line is connected to the first and second switching elements to transmit a data voltage. First and second gate shorting bars are connected to the first and second gate lines, respectively. The gate lines connected to the respective sub-pixels are connected to two or four gate shorting bars to allow an array test and a visual inspection test, and to thereby detect a bridge between respective sub-pixel electrode neighbors in a simplified manner.

24 Claims, 19 Drawing Sheets

LIQUID CRYSTAL DISPLAY AND TEST METHOD THEREOF

This application is a divisional application of U.S. application Ser. No. 11/359,955, filed on Feb. 22, 2006, which claims priority to Korean Patent Applications No. 2005-0014578, filed on Feb. 22, 2005 and No. 2005-0047262, filed on Jun. 2, 2005, and all the benefits accruing therefrom under 35 U.S.C. §119, and the contents of which in their entireties are herein incorporated by reference.

BACKGROUND OF THE INVENTION (a) Field of the Invention

The present invention relates to a liquid crystal display, and a method of testing the liquid crystal display. More particularly, the present invention relates to a liquid crystal display and a method of testing the liquid crystal display which easily detects the formation of a bridge between sub-pixel electrodes as well as between data lines of the liquid crystal display.

(b) Description of the Related Art

A liquid crystal display ("LCD"), an extensively used flat panel display device, includes two display panels mounting field-generating electrodes such as pixel and common electrodes thereon, and a liquid crystal layer sandwiched between the electrodes. The LCD generates an electric field in the liquid crystal layer by applying voltages to the field-generating electrodes, and aligns the liquid crystal molecules within the liquid crystal layer to control the polarization of light incident thereto, thereby displaying desired images.

Various tests should be made to detect defects of line breaks or short-circuits in fabricating the LCD, such as an open short ("OS") test, an array test, a visual inspection ("VI") test, a gross test, and a module test.

When source and drain electrodes are separated from each other during the process of fabricating a thin film transistor ("TFT") on a first panel in the LCD, the OS test is made to detect a break of the signal lines or a short-circuit of the TFT by applying a predetermined voltage thereto. Before the mother glass is divided into a plurality of cells, the array test is made to detect a break of the display signal lines by applying a predetermined voltage thereto and identifying the presence or absence of the output voltage. After the mother glass is divided into the plurality of cells and the upper and lower panels are assembled with each other, the VI test is made to visually detect a break of the display signal lines by applying a predetermined voltage thereto. Before the driving circuit is mounted, the gross test is made to detect the display image quality and a break of the display signal lines by applying the same voltage as the practical driving voltage thereto and identifying the display screen state. After the driving circuit is mounted, the module test is made to finally detect the optimal operation of the driving circuit.

A vertically-aligned ("VA") mode LCD provides an LCD in which the directors of liquid crystal molecules are aligned vertical to the upper and lower panels with no application of an electric field, as this gives a high contrast ratio and a wide reference viewing angle. The reference viewing angle refers to a viewing angle with a contrast ratio of 1:10, or an inter-gray luminance inversion limit angle.

With the VA mode LCD, cutouts or protrusions may be formed on the field-generating electrodes to realize the wide viewing angle. As the direction of the liquid crystal molecules to be inclined is determined by way of the cutouts or protrusions, the inclination directions of the liquid crystal molecules can be diversified, thereby widening the reference viewing angle.

However, the VA mode LCD involves poor visibility at the lateral side thereof, compared to the visibility at the front side thereof. For example, with the case of a patterned vertically aligned ("PVA") mode LCD having cutouts, the luminance thereof is heightened as it comes to the lateral side thereof, and in a serious case, the luminance difference between high grays is eradicated so that the display image may appear to be distorted.

In order to enhance the lateral side visibility, it has been proposed that each pixel should be divided into two sub-pixels, with the sub-pixels within each pixel receiving different voltages. However, when electrodes for the sub-pixels are patterned during the process of fabricating the LCD, a bridge may be formed such that it interconnects the sub-pixel electrodes or the neighboring data lines. From the circuit perspective, this means that those electrodes or data lines are short-circuited with each other. Consequently, the same voltage, rather than different voltages, is applied to the respective sub-pixels, thereby deteriorating the display image quality.

BRIEF SUMMARY OF THE INVENTION

When the electrodes or data lines are short-circuited by a connection, the bridge formation should be detected through making various kinds of tests. The present invention thus provides a liquid crystal display ("LCD") and a method of testing the LCD which easily detects the formation of a bridge between the sub-pixel electrodes as well as between the data lines.

An LCD with the following features is provided with a test method thereof.

According to exemplary embodiments of the present invention, an LCD includes a plurality of pixel electrodes arranged in a matrix, each pixel electrode having first and second sub-pixel electrodes differentiated in size from each other, and first and second switching elements connected to the first and second sub-pixel electrodes, respectively. First and second gate lines are connected to the first and second switching elements, respectively. A data line is connected to the first and second switching elements and transmits a data voltage. First and second gate shorting bars are connected to the first and second gate lines, respectively.

First and second gate test signals that are different from each other may be applied to the first and second gate shorting bars, respectively.

A positive data voltage may be applied to the data line under application of the first gate test signal, and a negative data voltage is applied to the data line under application of the second gate test signal.

The positive and negative data voltages may have a substantially same dimension.

A data shorting bar may be connected to the data line, and may be formed in a same layer of the LCD as the first and second gate lines.

A shielding electrode may be overlapped with the data line, and disposed between the two neighboring pixel electrodes.

The shielding electrode may be overlapped with at least one of the first and second gate lines.

The data voltages applied to the first and second sub-pixel electrodes may be differentiated in dimension from each other, and obtained from one image information set.

The first sub-pixel electrode may be larger in size than the second sub-pixel electrode, and the dimension of the data voltage applied to the first sub-pixel electrode may be smaller than the dimension of the data voltage applied to the second sub-pixel electrode.

The first and second gate shorting bars may be formed in a same layer of the liquid crystal display as the data line, and may be substantially parallel to the data line.

The first and second gate shorting bars may fall outside a periphery of a display panel for the LCD.

The LCD may further include gate pads connected to the first and second gate lines, respectively, and gate extension lines connecting the gate pads to the first and second gate shorting bars, respectively.

According to other exemplary embodiments of the present invention, an LCD includes a plurality of pixel electrodes arranged in a matrix, each pixel electrode having first and second sub-pixel electrodes differentiated in size from each other, and first and second switching elements connected to the first and second sub-pixel electrodes, respectively. First and second gate lines are connected to the first and second switching elements, respectively. A data line is connected to the first and second switching elements and transmits a data voltage. First and second gate shorting bars are connected to the first and second gate lines at odd-numbered pixel rows. Third and fourth gate shorting bars are connected to the first and second gate lines at even-numbered pixel rows.

First to fourth gate test signals may be applied to the first to fourth gate shorting bars, respectively.

A positive data voltage may be applied to the data line under application of the first and fourth gate test signals, while a negative data voltage is applied to the data line under application of the second and third gate test signals.

According to other exemplary embodiments of the present invention, a method of testing an LCD including a plurality of pixel electrodes having first and second sub-pixel electrodes, first and second switching elements connected to the first and second sub-pixel electrodes, respectively, first and second gate lines connected to the first and second switching elements, respectively, and a data line connected to the first and second switching elements, includes providing first and second gate shorting bars connected to the first and second gate lines, respectively, providing a data shorting bar connected to the data line, applying a positive data voltage to the data shorting bar, applying a first gate test signal to the first gate shorting bar to apply the positive data voltage to the first sub-pixel electrode, applying a negative data voltage to the data shorting bar, and applying a second gate test signal to the second gate shorting bar to apply the negative data voltage to the second sub-pixel electrode.

The method may further include detecting polarities of the first and second sub-pixel electrodes, such as by performing an array test.

The method may further include identifying existence of a bridge between the first and second sub-pixel electrodes, wherein positive and negative pixel voltages of the first and second sub-pixel electrodes having a bridge are not continuously sustained under application of positive and negative data voltages.

The method may further include detecting uniformity in luminance of the LCD, such as by performing a visual inspection test.

The method may further include identifying existence of a bridge between the first and second sub-pixel electrodes when brightness of a pixel having the first and second sub-pixel electrodes with a bridge is differentiated in brightness from other pixels not having a bridge.

The method may further include identifying existence of a bridge between the first sub-pixel electrode and a shielding electrode.

The method may further include separating the first and second gate shorting bars from the first and second gate lines, and separating the data shorting bar from the data line.

According to other exemplary embodiments of the present invention, a method of testing an LCD including a plurality of pixel electrodes having first and second sub-pixel electrodes, first and second switching elements connected to the first and second sub-pixel electrodes, respectively, first and second gate lines connected to the first and second switching elements, respectively, and a data line connected to the first and second switching elements, includes providing first and second gate shorting bars connected to the first and second gate lines at odd-numbered pixel rows, respectively, providing third and fourth gate shorting bars connected to the first and second gate lines at even-numbered pixel rows, respectively, providing a data shorting bar connected to the data line, applying a positive data voltage to the data shorting bar, applying a first gate test signal to the first gate shorting bar to apply the positive data voltage to the first sub-pixel electrode at the odd-numbered pixel rows, applying a negative data voltage to the data shorting bar, applying second and third gate test signals to the second and third gate shorting bars to apply the negative data voltage to the second sub-pixel electrode at the odd-numbered pixel rows and to the first sub-pixel electrode at the even-numbered pixel rows, and applying a fourth gate test signal to the fourth gate shorting bar to apply the positive data voltage to the second sub-pixel electrode at the even-numbered pixel rows.

The method may further include detecting polarities of the first and second sub-pixel electrodes.

The method may further include identifying existence of a bridge between the first and second sub-pixel electrodes.

The method may further include identifying existence of a bridge between the first sub-pixel electrodes of adjacent pixels.

The positive and negative data voltages may have substantially same dimensions.

The method may further include detecting uniformity of luminance of the LCD.

The method may further include separating the first and second gate shorting bars from the first and second gate lines at the odd-numbered pixel rows, separating the third and fourth gate shorting bars from the first and second gate lines at the even-numbered pixel rows, and separating the data shorting bar from the data line.

According to other exemplary embodiments of the present invention, an LCD includes a plurality of pixel electrodes arranged in a matrix, each pixel electrode having first and second sub-pixel electrodes differentiated in size from each other, and first and second switching elements connected to the first and second sub-pixel electrodes, respectively. A gate line is connected to the first and second switching elements. First and second data lines cross the gate line, and are connected to the first and second switching elements, respectively. First and second data shorting bars are connected to the first and second data lines, respectively.

Data voltages differentiated in polarity from each other may be applied to the first and second data shorting bars.

The data voltages differentiated in polarity from each other may have substantially same dimension.

A gate shorting bar may be connected to the gate line.

Data voltages applied to the first and second sub-pixel electrodes may be differentiated in dimension from each other, and are obtained from one image information set.

The first sub-pixel electrode may be larger in size than the second sub-pixel electrode, and dimension of the data voltage applied to the first sub-pixel electrode is smaller than dimension of the data voltage applied to the second sub-pixel electrode.

The first and second data shorting bars may be formed in a same layer of the liquid crystal display as the gate line.

The first and second data shorting bars may be substantially parallel to the gate line.

The first and second data shorting bars may fall outside a periphery of a display panel for the LCD.

According to other exemplary embodiments of the present invention, a method of testing a liquid crystal display including a plurality of pixel electrodes having first and second sub-pixel electrodes, first and second switching elements connected to the first and second sub-pixel electrodes, respectively, a gate line connected to the first and second switching elements, and first and second data lines connected to the first and second switching elements, respectively, includes providing first and second data shorting bars connected to the first and second data lines, providing a gate shorting bar connected to the gate line, applying a positive data voltage to the first data shorting bar, applying a negative data voltage to the second data shorting bar, and applying a gate test signal to the gate shorting bar to apply the positive data voltage to the first sub-pixel electrode and to apply the negative data voltage to the second sub-pixel electrode.

The method includes detecting uniformity of luminance of the LCD.

The method may further include identifying existence of a bridge between the first and second data lines.

The method may further include identifying existence of a bridge between the first and second sub-pixel electrodes.

The positive and negative data voltages have substantially same dimension.

The method may further include separating the first and second data shorting bars from the first and second data lines, and separating the gate shorting bar from the gate line.

BRIEF DESCRIPTION OF THE DRAWINGS

The present invention will become more apparent by describing embodiments thereof in detail with reference to the accompanying drawings, in which.

DETAILED DESCRIPTION OF THE INVENTION

Figure 1:
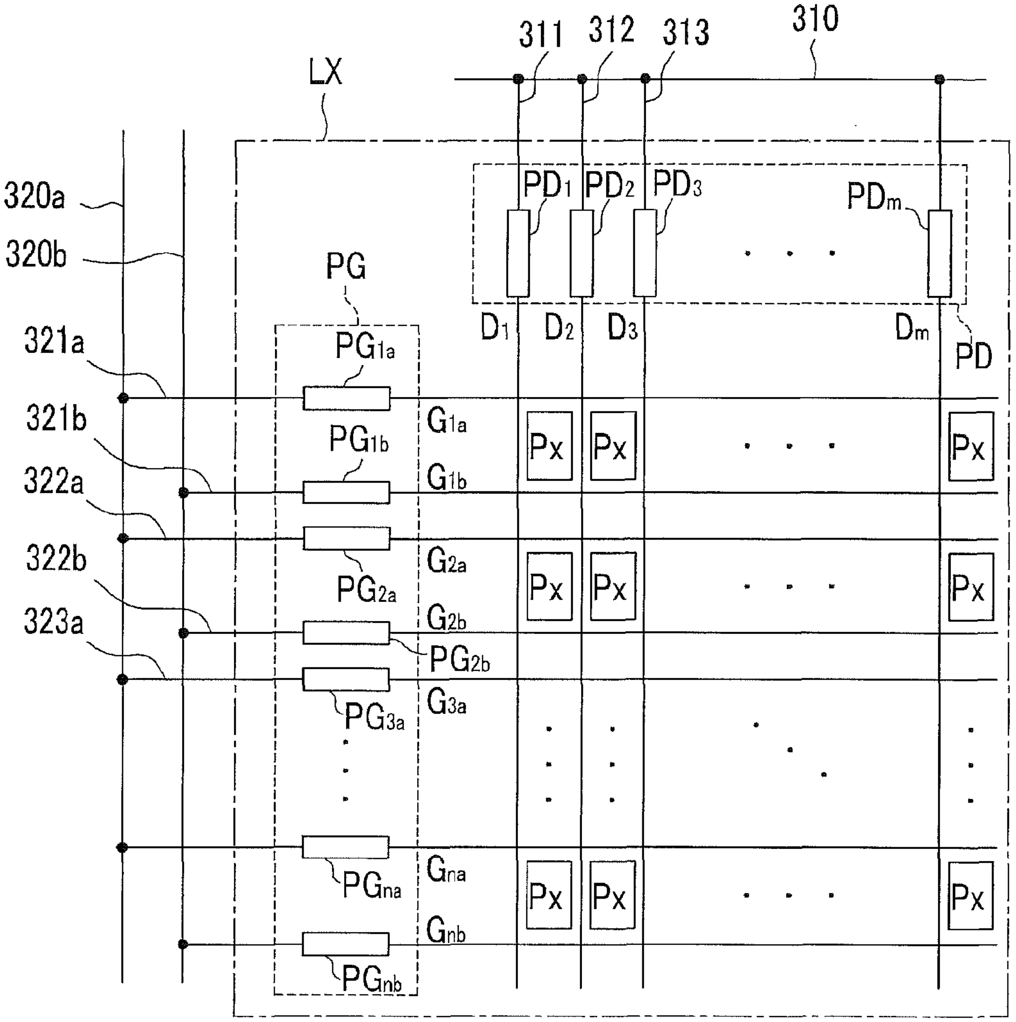
FIG. 1 is a schematic view of an exemplary embodiment of an LCD according to the present invention.

The invention will now be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout. In the drawings, the thickness of layers, films, and regions are exaggerated for clarity.

It will be understood that when an element is referred to as being "on" another element, it can be directly on the other element or intervening elements may be present there between. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments of the present invention are described herein with reference to cross section illustrations that are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present invention.

Now, exemplary embodiments of LCDs and test methods thereof according to the present invention will be described with reference to the accompanying drawings.

Figure 2:
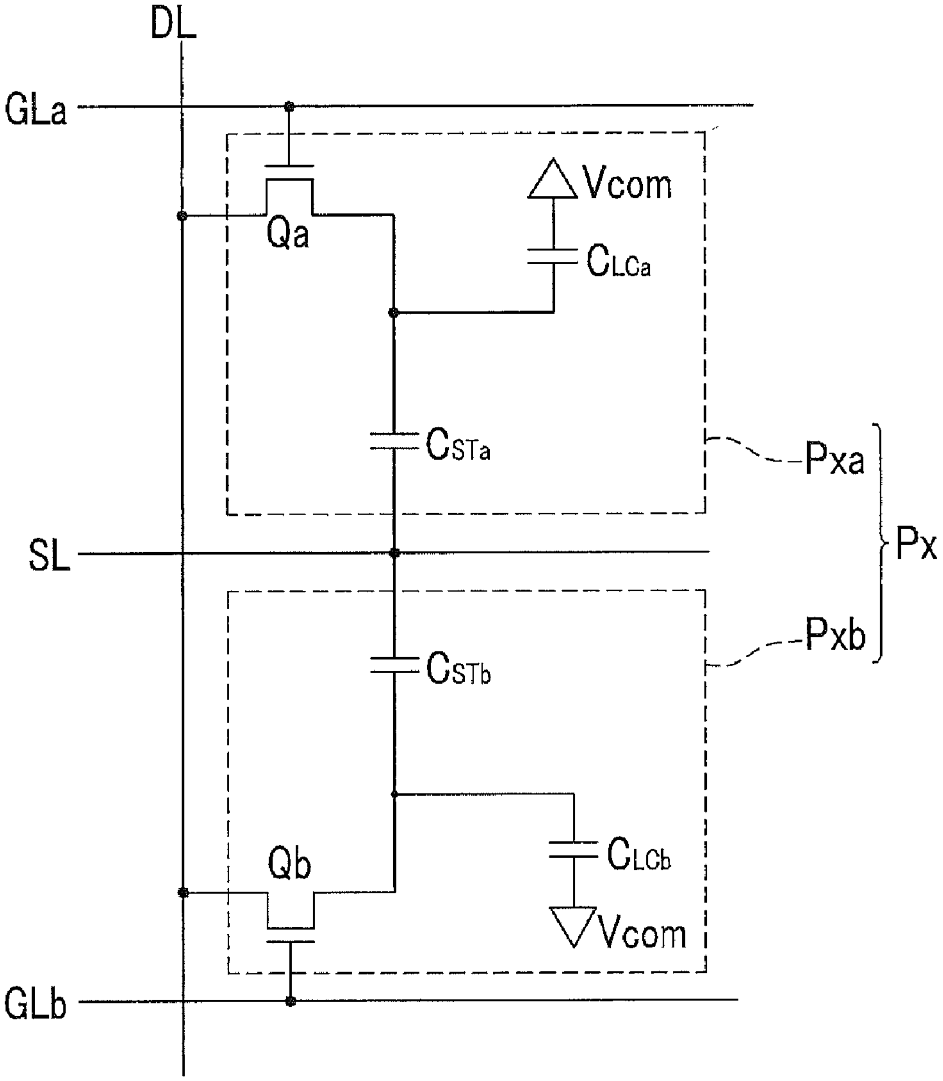
FIG. 2 is an equivalent circuit diagram of an exemplary pixel of an exemplary embodiment of an LCD according to the present invention.
Figure 3:
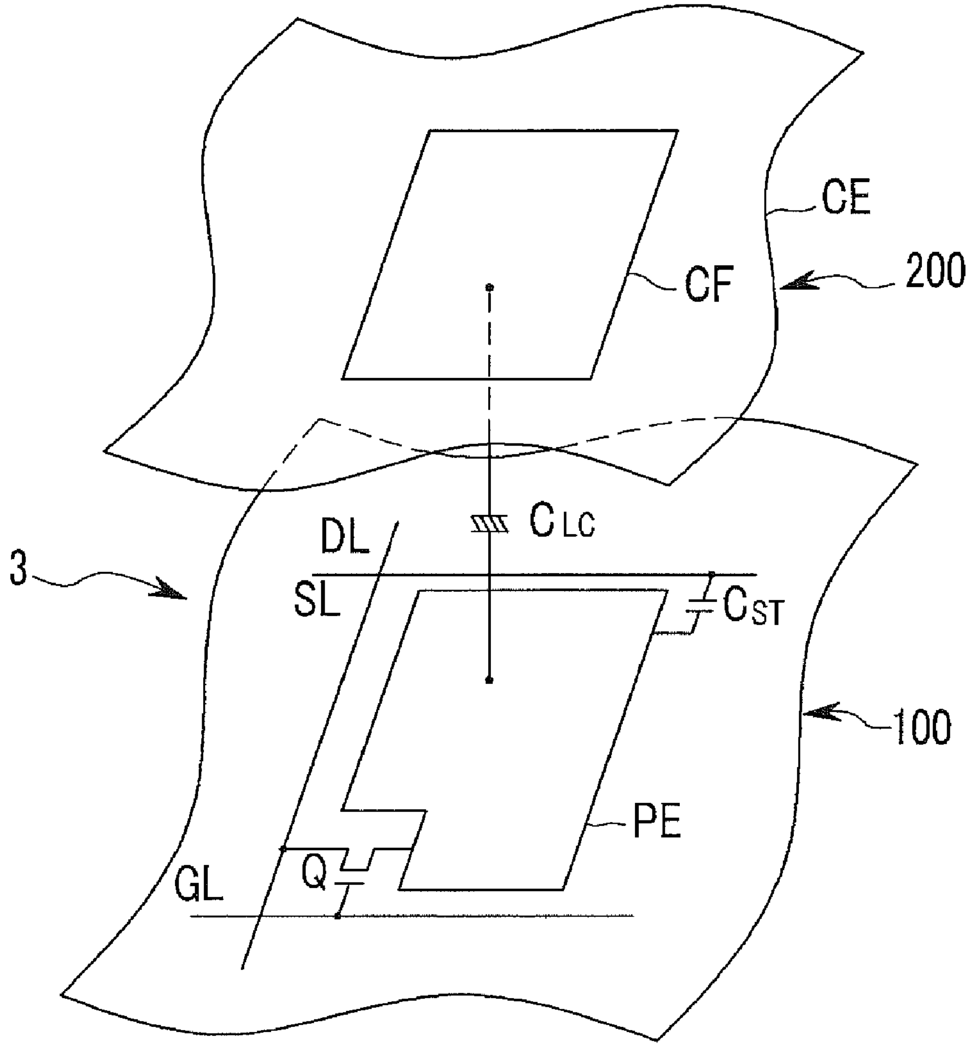
FIG. 3 is an equivalent circuit diagram of an exemplary sub-pixel of an exemplary embodiment of an LCD according to the present invention.

FIG. 1 is a schematic view of an exemplary embodiment of an LCD according to the present invention, FIG. 2 is an equivalent circuit diagram of an exemplary pixel of an exemplary embodiment of an LCD according to the present invention, and FIG. 3 is an equivalent circuit diagram of an exemplary sub-pixel of an exemplary embodiment of an LCD according to the present invention.

As shown in FIG. 1, an exemplary embodiment of an LCD includes a liquid crystal panel assembly, which has, from the equivalent circuit perspective, a plurality of display signal lines G1*a*-Gnb and D1-Dm, and a plurality of pixels PX connected to the display signal lines G1*a*-Gnb and D1-Dm and arranged roughly in the form of a matrix. With the structure shown in FIG. 3, the liquid crystal panel assembly includes lower and upper panels 100 and 200, and a liquid crystal layer 3 disposed between the two panels 100 and 200. The lower panel 100 may also be known as a thin film transistor ("TFT") panel or first panel, and the upper panel 200 may also be known as a common electrode panel, a color filter panel, or a second panel.

The display signal lines G1*a*-Gnb and D1-Dm are provided at the lower panel 100 with a plurality of gate lines G1*a*-Gnb for transmitting gate signals (also called the "scanning signals") and data lines D1-Dm for transmitting data signals. The gate lines G1*a*-Gnb extend in the direction of pixel rows substantially parallel to each other in a first direction, and the data lines D1-Dm extend in the direction of pixel columns substantially parallel to each other in a second direction. The first direction may be substantially perpendicular to the second direction.

The liquid crystal panel assembly further includes gate pads PG1*a*-PGnb connected to the gate lines G1*a*-Gnb, respectively, and data pads PD1-PDm connected to the data lines D1-Dm, respectively. That is, each gate line G1*a*-Gnb is connected to one gate pad PG, and each data line D1-Dm is connected to one data pad PD. First and second gate shorting bars 320*a* and 320*b* are connected to the relevant gate pads PG1-PGnb, and a data shorting bar 310 is connected to the respective data pads PD1-PDm.

The first gate shorting bar 320*a* is connected to the first gate pads PG1*a*, PG2*a*, PG3*a*, . . . via first gate extension lines 321*a*, 322*a*, 323*a*, . . . , and the second gate shorting bar 320*b* is connected to the second gate pads PG1*b*, PG2*b*, . . . via second gate extension lines 321*b*, 322*b*, . . . . The first and second gate shorting bars 320*a* and 320*b* may extend substantially perpendicular to the gate lines G1*a*-Gnb, and substantially parallel to the data lines D1-Dm. The data shorting bar 310 is connected to the data pads PD1, PD2, PD3, . . . via data extension lines 311, 312, 313, . . . . The data shorting bar 310 may extend substantially perpendicular to the data lines D1-Dm, and substantially parallel to the gate lines G1*a*-Gnb. Accordingly, the respective first gate lines G1*a*-Gna are connected to each other via the first gate shorting bar 320*a*, and the respective second gate lines G1*b*-Gnb are connected to each other via the second gate shorting bar 320*b*. Furthermore, the respective data lines D1-Dm are connected to each other via the data shorting bar 310.

Separate pads (not shown) are provided at the ends of the gate shorting bars 320*a* and 320*b* and the data shorting bar 310 to apply various kinds of test signals, as will be further described below.

The gate shorting bars 320*a* and 320*b* and the data shorting bar 310 undergo several tests, and are then removed along the LX line thereof. That is, elements within an interior of the LX periphery are retained for the LCD, and elements outside of the LX periphery, such as the first and second gate shorting bars 320*a*, 320*b* and the data shorting bar 310, are removed. Consequently, by removal of the shorting bars 320*a*, 320*b*, and 310, the respective gate and data lines G1*a*-Gnb and D1-Dm are separated from each other. A gate driver (not shown) and a data driver (not shown) are externally connected to the gate and the data pads PG1*a*-PGnb and PD1-PDm to apply gate and data signals to the gate and the data lines G1*a*-Gnb and D1-Dm, respectively. However, in the case that the gate driver is integrated at the liquid crystal panel assembly, the gate pads may be omitted while extending the gate extension lines 321*a*, 321*b*, 322*a*, 322*b*, . . . from the gate driver.

FIG. 2 illustrates the display signal lines and an equivalent circuit at an exemplary pixel Px, in which the display signal lines include gate lines indicated by GLa and GLb, a data line indicated by DL, and a storage electrode line SL extending nearly parallel to the gate lines GLa and GLb and dissecting the pixel PX.

The respective pixels Px include a pair of sub-pixels Pxa and Pxb, each of which has switching elements Qa and Qb connected to the relevant gate lines GLa and GLb and the data line DL, liquid crystal capacitors $C_{LCa}$ and $C_{LCb}$ connected to the switching elements Qa and Qb, and storage capacitors $C_{STa}$ and $C_{STb}$ connected to the switching elements Qa and Qb and the storage electrode line SL. In an alternative embodiment, the storage capacitors $C_{STa}$ and $C_{STb}$ may be omitted, and in such a case, the storage electrode line SL is dispensed with.

As shown in FIGS. 1 and 2, all the first gate lines GLa are connected to the first gate shorting bar 320*a*, and all the second gate lines GLb are connected to the second gate shorting bar 320*b*. Consequently, the same signal may be applied to the respective first sub-pixels Pxa, and the same signal may be applied to the respective second sub-pixels Pxb, however the signal applied to the first sub-pixels Pxa may be different from the signal applied to the second sub-pixels Pxb, as will be further described below.

As shown in FIG. 3, the switching element Q at the respective sub-pixels Pxa and Pxb is formed with a TFT formed at the lower panel 100, which is a triode device with a control terminal (gate) connected to the gate line GL, an input terminal (source) connected to the data line DL, and an output terminal (drain) connected to the liquid crystal capacitor $C_{LC}$ and the storage capacitor $C_{ST}$. While only one sub-pixel Pxb is illustrated in FIG. 3, it should be understood that each pixel PX also includes sub-pixel Pxa, as previously illustrated in FIG. 2.

The liquid crystal capacitor $C_{LC}$ employs the sub-pixel electrode PE of the lower panel 100 and the common electrode CE of the upper panel 200 as two terminals. The liquid crystal layer 3 disposed between the two electrodes PE and CE functions as a dielectric. The sub-pixel electrode PE is connected to the switching element Q, and the common electrode CE is formed on the entire surface, or at least substantially the entire surface, of the upper panel 200 to receive a common voltage Vcom. Alternatively, the common electrode CE may be provided at the lower panel 100, and in this case, at least one of the two electrodes PE and CE is formed in the shape of a line or a bar.

With the storage capacitor $C_{ST}$ subsidiary to the liquid crystal capacitor $C_{LC}$, the storage electrode line SL and the pixel electrode PE provided at the lower panel 100 are overlapped with each other while interposing an insulator, and a predetermined voltage such as a common voltage Vcom is applied to the storage electrode line SL. Alternatively, the storage capacitor $C_{ST}$ may be formed by overlapping the sub-pixel electrode PE with the immediate previous gate line while interposing an insulator.

In order for the liquid crystal panel assembly to display colors, the respective pixels may intrinsically express one of the primary (main) colors (the spatial division), or alternately express the primary colors in temporal order (the time division) such that the desired colors can be perceived by the spatial and temporal sum of the primary colors. The primary colors preferably include red, green, and blue colors, however alternate colors are also within the scope of these embodiments. FIG. 3 shows an example of the time division where each pixel has a color filer CF expressing one of the primary colors at the region of the upper panel 200. In an alternative embodiment, the color filter CF may be formed over or under the sub-pixel electrode PE of the lower panel 100.

The structure of the LCD will be further described with reference to FIGS. 4 to 6.

Figure 4:
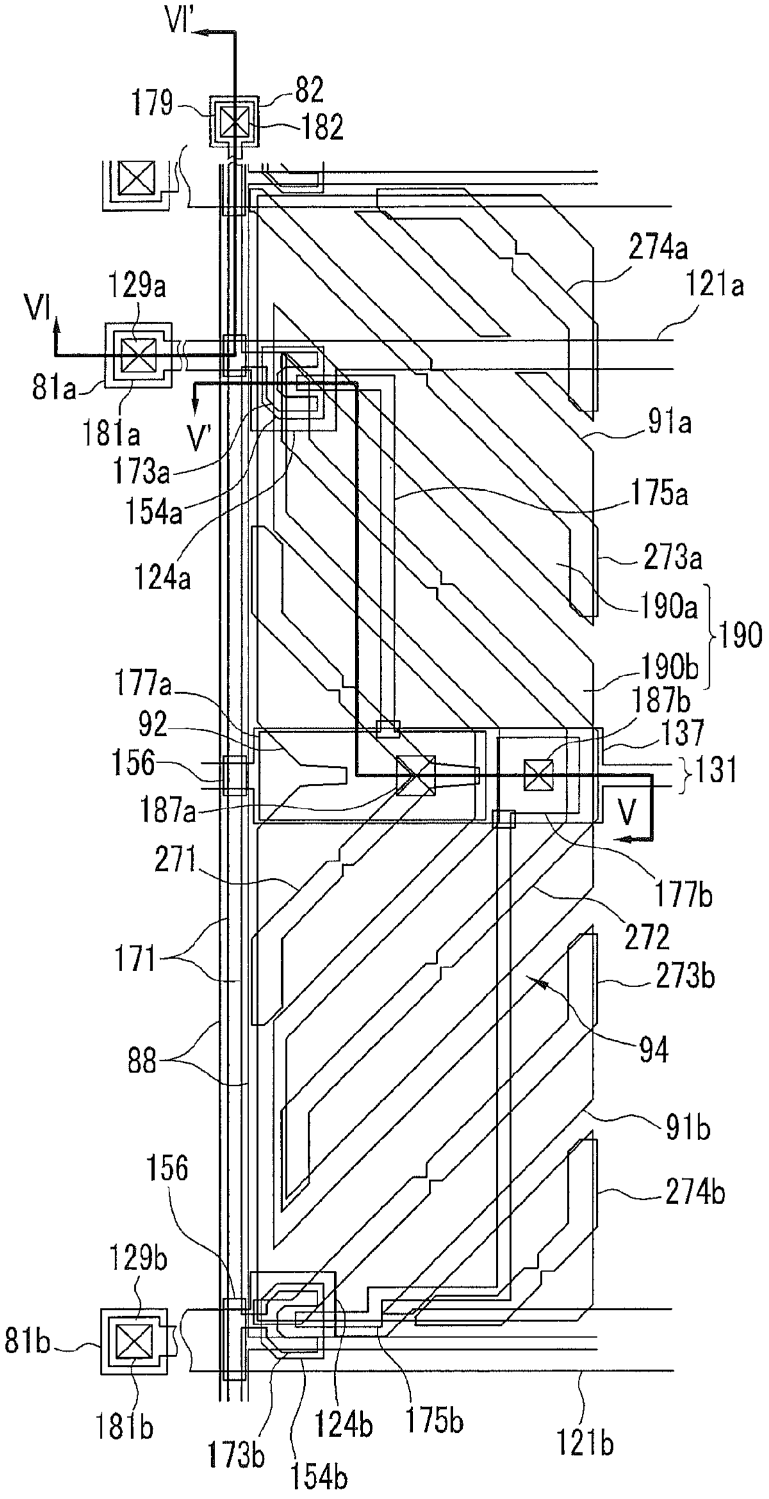
FIG. 4 is a plan view of an exemplary embodiment of an LCD according to the present invention.
Figure 5:
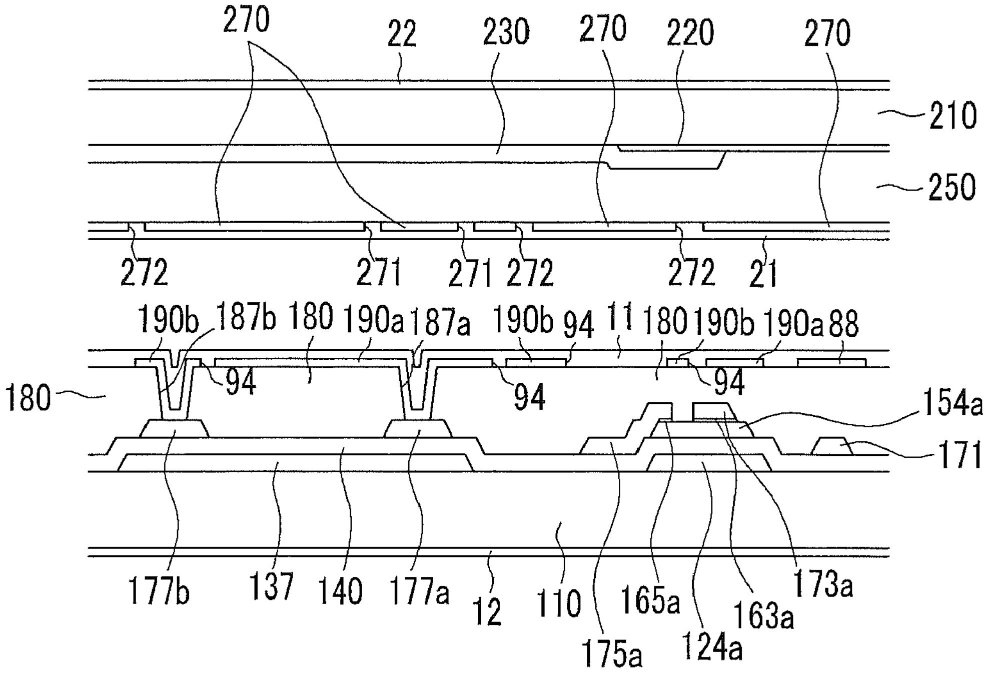
FIGS. 5 and 6 are cross-sectional views of the exemplary embodiment of the LCD taken along line V-V' and line VI-VI' of FIG. 4.
Figure 6:
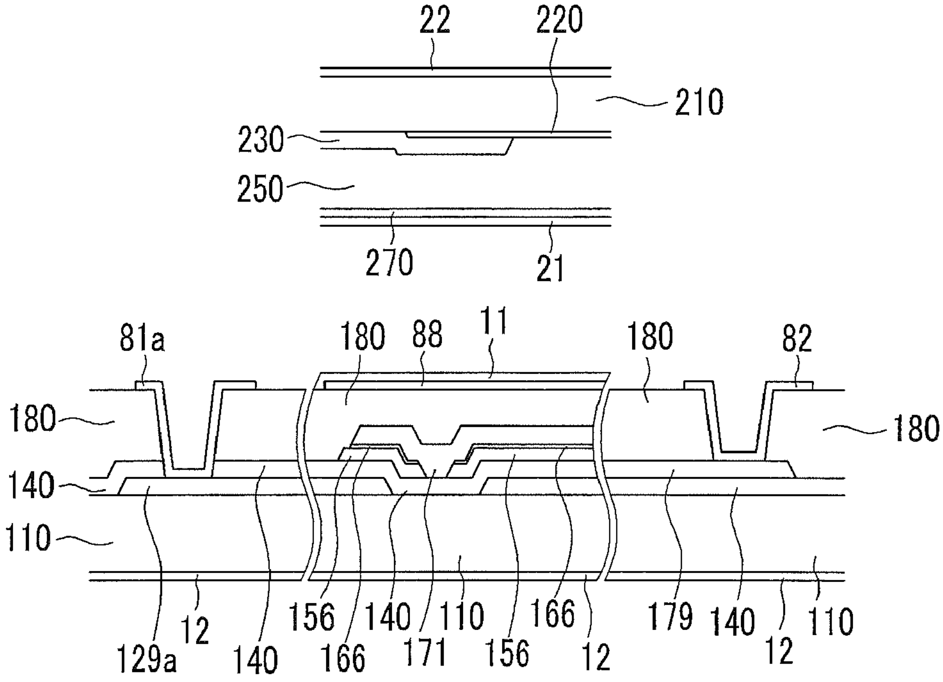

FIG. 4 is a plan view of an exemplary embodiment of an LCD according to the present invention, and FIGS. 5 and 6 are cross-sectional views of the exemplary embodiment of the LCD taken along line V-V' and line VI-VI' of FIG. 4.

The LCD as illustrated in FIGS. 4-6 includes a lower panel 100, an upper panel 200 facing the lower panel 100, and a liquid crystal layer 3 disposed between the panels 100 and 200.

First, the lower panel 100 will be further described.

An insulating substrate 110 based on transparent glass or plastic is overlaid with pairs of first and second gate lines 121*a* and 121*b*, and a plurality of storage electrode lines 131.

The gate lines 121*a* and 121*b* extend horizontally such as in a transverse or first direction, and are physico-electrically separated from each other to transmit gate signals. The first and second gate lines 121*a* and 121*b* include portions that deviate from the longitudinal direction of the first and second gate lines 121*a* and 121*b*, and have left-sided wide area end portions 129*a* and 129*b* for connecting a plurality of first and second gate electrodes 124*a* and 124*b*, protruded from the first and second gate lines 121*a* and 121*b*, to another layer or an external driving circuit. Alternatively, the end portions 129*a* and 129*b* may be arranged at the left and right sides, such as alternately arranged, or both only at the right side.

The storage electrode line 131 also extends horizontally, substantially parallel to the first and second gate lines 121*a* and 121*b*, and may be located closer to the first gate line 121*a* than to the second gate line 121*b*. The respective storage electrode lines 131 include a plurality of storage electrodes 137 protruding from the storage electrode line 131 with a wide area. The storage electrodes 137 may be rectangular shaped and symmetrical to the storage electrode line 131. A predetermined voltage is applied to the storage electrode lines 131, such as a common voltage applied to a common electrode 270 of the upper panel 200 of the LCD.

The gate lines 121*a* and 121*b* and the storage electrode line 131 are formed with an aluminum-based metallic material such as aluminum (Al) and an aluminum alloy, a silver-based metallic material such as silver (Ag) and a silver alloy, a copper-based metallic material such as copper (Cu) and a copper alloy, a molybdenum-based metallic material such as molybdenum (Mo) and a molybdenum alloy, chromium (Cr), titanium (Ti), or tantalum (Ta). Alternatively, the gate lines 121*a* and 121*b* and the storage electrode line 131 may have a multi-layered structure with two conductive layers (not shown) differentiated in physical properties thereof. If a multi-layered structure is employed, one of the conductive layers may be formed with a metallic material having low resistivity such as an aluminum-based metallic material, a silver-based metallic material, and a copper-based metallic material such that it can reduce the signal delay or voltage drop of the gate lines 121*a* and 121*b* and the storage electrode line 131. By contrast, the other conductive layer in a multi-layered structure may be formed with a material having an excellent contact characteristic with respect to other materials such as indium tin oxide ("ITO") and indium zinc oxide ("IZO"), such as a molybdenum-based metallic material, chromium, titanium, and tantalum. Examples of such a combination include a structure with a chromium-based lower layer and an aluminum-based upper layer, and a structure with an aluminum-based lower layer and a molybdenum-based upper layer. While particular embodiments and examples have been described, the gate lines 121*a* and 121*b* and the storage electrode line 131 may be formed with various kinds of other metallic materials and conductors.

The lateral sides of the gate lines 121*a* and 121*b* and the storage electrode line 131 are inclined with respect to the surface of the insulating substrate 110, and the inclination angle thereof preferably ranges between about 30 to about −80°.

A gate insulating layer 140 is formed on the gate lines 121*a* and 121*b* and the storage electrode line 131 and may be further formed over exposed portions of the insulating substrate 110. The gate insulating layer 140 may be made with silicon nitride (SiNx) or the like.

A plurality of island-shaped semiconductors 154*a*, 154*b* and 156 are formed on the gate insulating layer 140 with hydrogenated amorphous silicon ("a-Si"). The semiconductors 154*a* and 154*b* are formed on the gate electrodes 124*a* and 124*b*, respectively. The semiconductor 156 is formed on the gate lines 121*a* and 121*b* and the storage electrode line 131.

A plurality of island-shaped ohmic contacts 163*a*, 165*a* and 166 are formed on the semiconductors 154*a*, 154*b*, and 156 with n+ hydrogenated a-Si where n-type impurities such as silicide and phosphorous are doped at a high concentration. A pair of the first ohmic contacts 163*a* and 165*a* and a pair of the second ohmic contact (not illustrated) are placed on the semiconductors 154*a* and 154*b*, respectively and are spaced apart from each other to form a channel on the semiconductors 154*a* and 154*b*.

The lateral sides of the semiconductors 154*a*, 154*b*, and 156 and the ohmic contacts 163*a*, 165*a*, and 166 are inclined with respect to the surface of the insulating substrate 110, and the inclination angles thereof are preferably in a range of about 30 to about 80°.

A plurality of data lines 171 and pairs of drain electrodes 175*a* and 175*b* separated from the data lines 171 are formed on the ohmic contacts 163*a*, 165*a*, and 166, and on the gate insulating layer 140.

The data lines 171 extend vertically, such as in a longitudinal or second direction, such that they cross the gate lines 121*a* and 121*b* and the storage electrode line 131 to transmit data voltages thereto. The data lines 171 are insulated from the gate lines 121*a* and 121*b* by the gate insulating layer 140 disposed there between. The respective data lines 171 include a plurality of first and second source electrodes 173*a* and 173*b* extended toward the first and second drain electrodes 175*a* and 175*b*, respectively, and end portions 179 enlarged in width to make a connection with another layer or an external device, such as a data driving circuit.

The first and second drain electrodes 175*a* and 175*b* extend in first and second directions from the bar-shaped end portions thereof placed over the semiconductors 154*a* and 154*b*, towards the storage electrode 137, and have wide extensions 177*a* and 177*b* overlapped with the storage electrode 137. The respective source electrodes 173*a* and 173*b* are bent such that they surround the bar-shaped end portions of the drain electrodes 175*a* and 175*b*. The first and second gate electrodes 124*a* and 124*b*, the first and second source electrodes 173*a* and 173*b*, and the first and second drain electrodes 175*a* and 175*b* form first and second thin film transistors ("TFTs") Qa and Qb together with the semiconductors 154*a* and 154*b*. The channels of the TFTs Qa and Qb are formed on the semiconductors 154*a* and 154*b* between the first and second source electrodes 173*a* and 173*b* and the first and second drain electrodes 175*a* and 175*b* and between the island-shaped ohmic contacts 163*a*, 165*a*.

The data line 171 and the drain electrodes 175*a* and 175*b* are preferably formed with a chromium-based metallic metal, a molybdenum-based metal, or a refractory metallic material such as tantalum and titanium, and may have a multi-layered structure with a lower layer (not shown) based on the refractory metal, and an upper layer (not shown) formed on the lower layer with a low resistance material. Examples of the multi-layered structure include, but are not limited to, a triple-layered structure with a molybdenum layer—an aluminum layer—a molybdenum layer in addition to the double-layered structure with a chromium or molybdenum-based lower layer and an aluminum-based upper layer. However, the data lines 171 and the drain electrodes 175*a* and 175*b* may be made of various metals or conductors.

As with the gate lines 121*a* and 121*b* and the storage electrode line 131, the lateral sides of the data line 171 and the drain electrodes 175*a* and 175*b* have inclined edge profiles with respect to a surface of the insulating substrate 110, and the inclination angles thereof range about 30 to about 80°.

The ohmic contacts 163*a*, 163*b*, 165*a*, 165*b*, and 166 are only interposed between the underlying semiconductors 154*a*, 154*b*, and 156 and the overlying data line 171 and drain electrodes 175*a* and 175*b* to lower the contact resistance therebetween. The semiconductors 154*a* and 154*b* have portions exposed through the source electrodes 173*a* and 173*b* and the drain electrodes 175*a* and 175*b*. Furthermore, as described above, the semiconductors 156 are formed at the crossed regions of the gate lines 121*a* and 121*b* and the storage electrode and data lines 131 and 171 and at the crossed regions of the drain electrodes 175*a* and 175*b* and the storage electrode 137 to smooth the profile thereof at those crossed regions and prevent the data line 171 and the drain electrodes 175*a* and 175*b* from being cut.

A passivation layer 180 is formed on the data line 171, the drain electrodes 175*a* and 175*b*, and the exposed portions of the semiconductors 154*a* and 154*b*. The passivation layer 180 may be further formed on exposed portions of the gate insulating layer 140 as shown. The passivation layer 180 is formed with an inorganic material based on silicon nitride or silicon oxide, an organic material bearing excellent flattening characteristics and photosensitivity, or a low dielectric insulating material such as a-Si:C:O and a-Si:O:F formed through plasma enhanced chemical vapor deposition ("PECVD"). Alternatively, the passivation layer 180 may have a double-layered structure with a lower inorganic layer and an upper inorganic layer to protect the exposed portions of the semiconductors 154*a* and 154*b* while ensuring the excellent characteristics of the organic layer.

A plurality of contact holes 182, 187*a*, and 187*b* are formed at the passivation layer 180 to expose the end portions 179 of the data line 171 and the extensions 177*a* and 177*b* of the drain electrodes 175*a* and 175*b*. A plurality of contact holes 181*a* and 181*b* are formed at the passivation layer 180 and the gate insulating layer 140 to expose the end portions 129*a* and 129*b* of the gate lines 121*a* and 121*b*.

A plurality of pixel electrodes 190 with first and second sub-pixel electrodes 190*a* and 190*b*, a plurality of shielding electrodes 88, and a plurality of contact assistants 81*a*, 81*b*, and 82 are formed on the passivation layer 180. The pixel electrodes 190, the shielding electrodes 88, and the contact assistants 81*a*, 81*b*, and 82 are formed with a transparent conductive material such as ITO and IZO, or a reflective conductive material such as aluminum for use in a reflective LCD.

The first and second sub-pixel electrodes 190*a* and 190*b* are physico-electrically connected to the first and second drain electrodes 175*a* and 175*b* through the contact holes 187*a* and 187*b* to receive data voltages from the first and second drain electrodes 175*a* and 175*b*. Predetermined voltages different from each other are applied to a pair of the sub-pixel electrodes 190*a* and 190*b* with respect to one input image signal, and the dimensions thereof are determined depending upon the dimension and shape of the sub-pixel electrodes 190*a* and 190*b*. Furthermore, the areas of the sub-pixel electrodes 190*a* and 190*b* may differ from each other. For instance, the second sub-pixel electrode 190*b* receives a voltage higher than that of the first sub-pixel electrode 190*a*, and has an area smaller than that of the first sub-pixel electrode 190*a*.

Upon receipt of the data voltages, the sub-pixel electrodes 190*a* and 190*b* generate electric fields together with the common electrode 270 of the opposing panel 200 supplied with a common voltage, and align the liquid crystal molecules of the liquid crystal layer 3 between the two electrodes 190*a* and 190*b* and the common electrode 270.

As described above, the sub-pixel electrodes 190*a* and 190*b* and the common electrode 270 form liquid crystal capacitors $C_{LCa}$ and $C_{LCb}$ to sustain the voltages applied thereto even after the TFTs Qa and Qb turn off. Storage capacitors $C_{STa}$ and $C_{STb}$ are arranged parallel to the liquid crystal capacitors $C_{LCa}$ and $C_{LCb}$ to reinforce the voltage storage capacity. The storage capacitors $C_{STa}$ and $C_{STb}$ are formed by overlapping the first and second sub-pixel electrodes 190*a* and 190*b* with the drain electrodes 175*a* and 175*b* and the storage electrodes 137 connected thereto.

The respective pixel electrodes 190 are chamfered or edge-cut at the right corner thereof, and the cut leg is angled against the gate lines 121*a* and 121*b* at about 45°.

A pair of the first and second sub-pixel electrodes 190*a* and 190*b* forming one pixel electrode 190 engage with each other while interposing a gap 94, and the pixel electrode 190 is outlined roughly with a rectangular shape. The second sub-pixel electrode 190*b* is shaped as a rotated equilateral trapezoid having a trapezoid-hollowed base. The second sub-pixel electrode 190*b* is mostly surrounded by the first sub-pixel electrode 190*a*, that is, the second sub-pixel electrode 190*b* is nested within the first sub-pixel electrode 190*a*. The first sub-pixel electrode 190*a* is formed with an upper trapezoid, a lower trapezoid, and a middle trapezoid connected to each other at the left sides thereof. The first sub-pixel electrode 190*a* has a pair of cutouts 91*a* and 91*b* extended from the top side of the upper trapezoid and the bottom side of the lower trapezoid to the right sides thereof. The cutout 91*a* is formed with two cut sub-portions separated from each other at the meeting area thereof with the first gate line 121*a*. The middle trapezoid of the first sub-pixel electrode 190*a* is fitted into the hollowed base of the second sub-pixel electrode 190*b*. The first sub-pixel electrode 190*a* has a cutout 92 extended along the storage electrode line 131, and the cutout 92 has an entrance at the left side of the first sub-pixel electrode 190*a* adjacent the data line 171 for the pixel, and a horizontal portion horizontally extended from the entrance. The entrance of the cutout 92 has a pair of legs angled against the storage electrode line 131 at about 45°. The gap 94 between the first and second sub-pixel electrodes 190*a* and 190*b* has two pairs of upper and lower inclined portions angled against the gate lines 121*a* and 121*b* at about 45° substantially with a uniform width, and three vertical portions substantially with a uniform width. For explanatory convenience, the gap 94 may also be referred to as a cutout.

The pixel electrode 190 has cutouts 91*a*, 91*b*, and 92, and is partitioned into a plurality of regions by way of the cutouts 91*a*, 91*b*, and 92 and the gap 94. The cutouts 91*a*, 91*b*, and 92 obliquely extend from the left side of the pixel electrode 190 to the right side thereof, and are in inversion symmetry with the storage electrode line 131. The cutouts are angled against the gate lines 121*a* and 121*b* at about 45°. The cutout 91*a* and slanted portion of the gap 94 disposed on the upper half portion of the pixel electrode 190 is substantially perpendicular to the cutout 91*b* and slanted portion of the gap 94 disposed on the lower half portion of the pixel electrode 190.

Accordingly, the upper half and the lower half of the pixel electrode 190 are divided into four regions by way of the cutouts 91*a*, 91*b*, and 92 and the gap 94, respectively. While a particular arrangement has been illustrated and described, the number of division regions or cutouts may be varied depending upon the design factors such as pixel size, the length ratio of the horizontal to the vertical sides of the pixel electrode 190, and the kinds or characteristics of the liquid crystal layer 3.

The pixel electrode 190 is overlapped with the gate line 121 neighboring thereto to enhance the aperture ratio.

The shielding electrode 88 extends along the data line 171 and the gate line 121*b*, and a portion thereof placed over the data line 171 completely covers the data line 171. The portion of the shielding electrode 88 placed over the gate line 121*b* is located within the boundary of the gate line 121*b* with a width smaller than that of the gate line 121*b*. The data line 171 disposed between the two neighboring pixel electrodes 190 is completely covered by the shielding electrode 88. However, the width of the shielding electrode 88 may be controlled such that it is smaller than the data line 171, or to have a boundary located external to the boundary of the gate line 121*b*. A common voltage is applied to the shielding electrode 88. For this purpose, the shielding electrode 88 is connected to the storage electrode line 131 through contact holes (not shown) within the passivation layer 180 and the gate insulating layer 140, or to a short point (not shown) at which the common voltage is applied from the lower panel 100 to the upper panel 200. It is preferable in minimizing the aperture ratio to reduce the distance between the shielding electrode 88 and the pixel electrode 190 as much as possible.

When the shielding electrode 88 receiving the common voltage is located over the data line 171, the shielding electrode 88 shields an electric field formed between the data line 171 and the pixel electrode 190 as well as between the data line 171 and the common electrode 270, thereby reducing voltage distortion of the pixel electrode 190 and signal delay and distortion of the data voltage transmitted by the data line 171.

Furthermore, the pixel electrode 190 and the shielding electrode 88 should be spaced apart from each other with a sufficient distance to prevent short-circuiting thereof. Therefore, the pixel electrode 190 extends far enough from the data line 171 so that the parasitic capacitance therebetween is reduced. Moreover, as the permittivity of the liquid crystal layer 3 is higher than that of the passivation layer 180, the parasitic capacitance between the data line 171 and the shielding electrode 88 is smaller than the parasitic capacitance between the data line 171 and the common electrode 270 in the absence of the shielding electrode 88.

As the pixel electrode 190 and the shielding electrode 88 are formed with the same layer, the distance therebetween is uniformly maintained, and accordingly, the parasitic capacitance therebetween is sustained to be constant.

The contact assistants 81*a*, 81*b*, and 82 are connected to the end portions 129*a* and 129*b* of the gate lines 121*a* and 121*b* and the end portion 179 of the data line 171 through the contact holes 181*a*, 181*b*, and 182, respectively. The contact assistants 81*a*, 81*b*, and 82 serve to reinforce the adhesion between the exposed end portions 129*a* and 129*b* of the gate lines 121*a* and 121*b* and the exposed end portion 179 of the data line 171 and external devices, and protect them.

An alignment layer 11 is formed on the pixel electrode 190, the shielding electrode 88, the contact assistants 81*a*, 81*b*, and

82, and the passivation layer 180, to align the liquid crystal layer 3. The alignment layer 11 may be a horizontally aligned layer.

A common electrode panel 200 will now be described.

A light blocking member 220, also termed a black matrix, is formed on an insulating substrate 210 based on transparent glass or plastic to prevent leakage of light. The light blocking member 220 faces the pixel electrode 190, and has a plurality of opening portions with the same shape as the pixel electrode 190. Alternatively, the light blocking member 220 may be formed with a portion corresponding to the data line 171, and portions corresponding to the TFTs Qa and Qb. However, the light blocking member 220 may be formed with various shapes to prevent the leakage of light around the pixel electrode 190 and the TFTs Qa and Qb.

A plurality of color filters 230 are formed on the substrate 210. The color filters 230 are mostly placed within the region surrounded by the light blocking member 220, and vertically and horizontally extend with respect to the pixel electrodes 190. The color filters 230 may express one of the three colors of red, green, and blue, although other colors are within the scope of these embodiments.

A cover layer or overcoat 250 is formed on the color filters 230 and the light blocking member 220 to prevent the color filters 230 from being exposed, and to provide a flattened surface. The cover layer 250 may be made of an organic insulator.

A common electrode 270 is formed on the cover layer 250 with a transparent conductive material such as, but not limited to, ITO and IZO.

The common electrode 270 has a plurality of sets of cutouts 271-274*b*.

Each set of the cutouts 271-274*b* faces one pixel electrode 190, and includes middle cutouts 271 and 272, upper cutouts 273*a* and 274*a*, and lower cutouts 273*b* and 274*b*. The cutouts 271-274*b* are arranged on the common electrode 270 corresponding to positions between the cutouts 91*a*, 91*b*, 92, and 94 of the neighboring pixel electrodes 190 as well as between the peripheral cutouts 91*a* and 91*b* and the leg of the pixel electrode 190. Furthermore, the respective cutouts 271-274*b* include at least one inclined portion extended parallel to the cutouts 91*a*, 91*b*, and 92 and the gap 94 of the pixel electrode 190.

The lower and upper cutouts 273*a*-274*b* include an inclined portion extended along the common electrode 270 from a position corresponding to the right side of the pixel electrode 190 toward the lower or the upper side thereof, and horizontal and vertical portions extended from positions corresponding to the respective ends of the inclined portion along the sides of the pixel electrode 190 while being overlapped with those sides and obtuse-angled against the inclined portion.

The first middle cutout 271 has a central horizontal portion on the common electrode 270 horizontally extended from a position corresponding to the left side of the pixel electrode 190, a pair of inclined portions extended from positions corresponding to the end of the central horizontal portion toward the left side of the pixel electrode 190 while being inclined with respect to the central horizontal portion, and vertical end portions extended from positions corresponding to the ends of the inclined portions while being overlapped with the left side of the pixel electrode 190 and obtuse-angled against the inclined portions. The second middle cutout 272 includes a vertical portion on the common electrode 270 extended along positions corresponding to the right side of the second sub-pixel electrode 190*b* while being overlapped therewith, a pair of inclined portions extended from positions corresponding to the respective ends of the vertical portion toward the left side of the pixel electrode 190, and vertical end portions extended from positions corresponding to the ends of the inclined portions along the left side of the second sub-pixel electrode 190*b* while being overlapped therewith and obtuse-angled against the inclined portions.

Triangle-shaped notches are formed at the inclined portions of the cutouts 271-274*b*. Alternatively, each notch may be formed in the shape of a rectangle, a trapezoid, or a semicircle, and may be concave or convex. The notches determine the alignment of the liquid crystal molecules 3 located at the periphery of the region corresponding to the cutouts 271-274*b*.

While a particular arrangement has been illustrated and described, the number of the cutouts 271-274*b* may be varied depending upon design factors, and the light blocking member 220 may be overlapped with the cutouts 271-274*b* to prevent the leakage of light around the cutouts 271-274*b*.

As the same common voltage is applied to the common electrode 270 and the shielding electrode 88, no electric field exists between the common electrode 270 and the shielding electrode 88. Accordingly, the liquid crystal molecules disposed between the common electrode 270 and the shielding electrode 88 continuously hold the initial vertical alignment state thereof, and the light incident thereto is intercepted.

An alignment layer 21 is coated on the common electrode 270 and the cover layer 250 to align the liquid crystal layer 3. The alignment layer 21 may be a horizontal alignment layer.

Polarizing plates 12 and 22 are provided on the outer surfaces of the panels 100 and 200, and the light transmission axes of the two polarizing plates 12 and 22 proceed perpendicular to each other. One of the light transmission axes of the two polarizing plates 12 and 22 (or the light absorption axis thereof) proceeds in the horizontal direction. In the case of a reflection type of LCD, one of the two polarizing plates 12 and 22 may be omitted.

The liquid crystal layer 3 has negative dielectric anisotropy, and the liquid crystal molecules of the liquid crystal layer 3 have directors vertically aligned with respect to the surfaces of the two panels when there is no application of a voltage.

When a common voltage is applied to the common electrode 270 and a data voltage is applied to the pixel electrode 190, an electric field is generated nearly vertical to the surfaces of the panels 100 and 200. The cutouts 91*a*-94 and 271-274*b* of the electrodes 190 and 270 deform such an electric field, and form components vertical to the sides of the cutouts 91*a*-94 and 271-274*b*.

Accordingly, the electric field is inclined with respect to the direction vertical to the surfaces of the panels 100 and 200. The liquid crystal molecules are aligned in response to the electric field such that the directors thereof proceed vertical to the electric field. At this time, the electric fields formed around the sides of the cutouts 91*a*-94 and 271-274*b* and the pixel electrode 190 do not proceed parallel to the directors of the liquid crystal molecules, but are angled against them at a predetermined angle. Therefore, the liquid crystal molecules are rotated on the plane between the directors of the liquid crystal molecules and the electric fields in the direction with a short movement distance. Consequently, the sides of a set of the cutouts 91*a*-94 and 271-274*b* and the pixel electrode 190 partition the portion of the liquid crystal layer 3 placed on the pixel electrode 190 into a plurality of domains where the inclination directions of the liquid crystal molecules differ from each other, and hence the reference viewing angle is enlarged.

At least one of the cutouts 91_a_-94 and 271-274_b_ may be replaced by a protrusion or a hollowed portion, and the shape and arrangement of the cutouts 91_a_-94 and 271-274_b_ may be varied.

An exemplary gate shorting bar of the exemplary embodiment of the LCD according to the present invention will be further described with reference to FIGS. 7 and 8.

Figure 7:
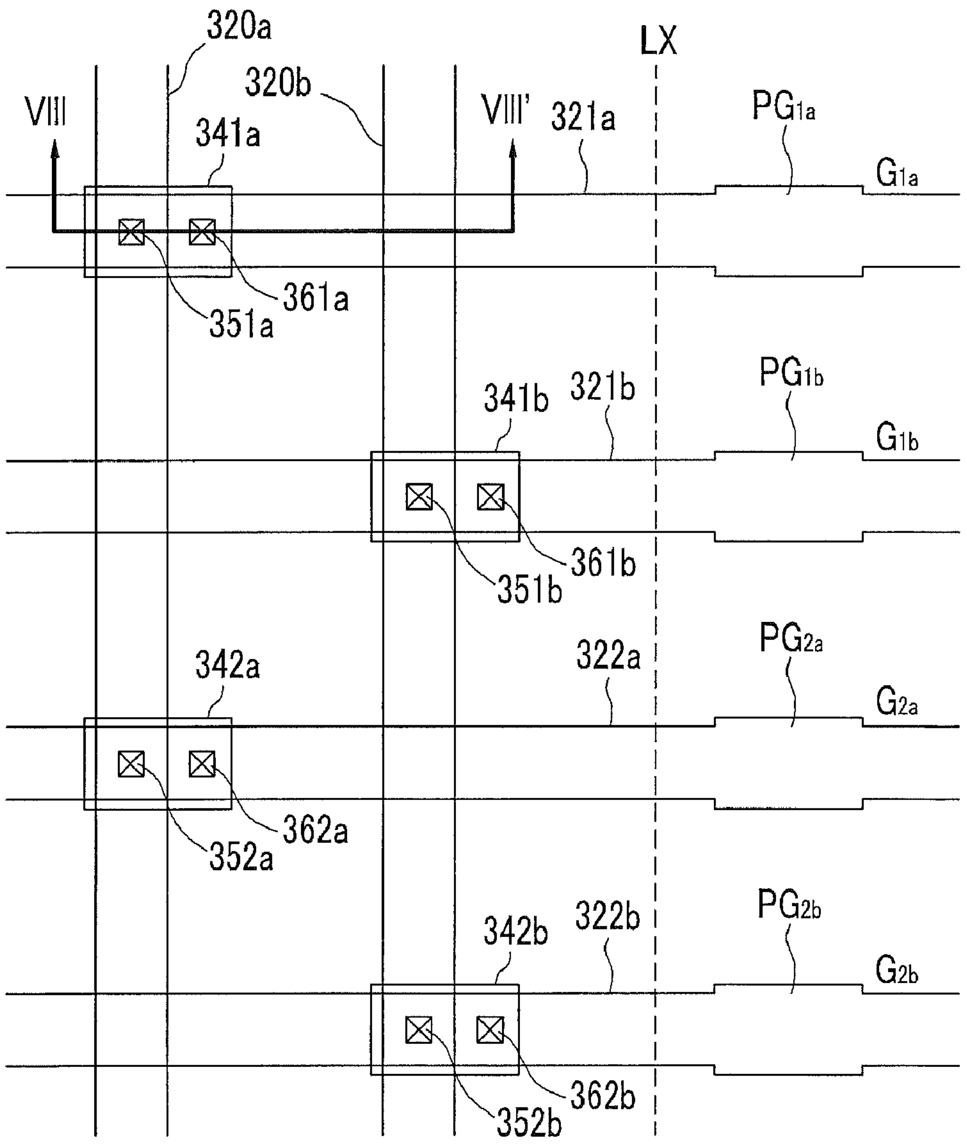
FIG. 7 is an amplified view of exemplary gate shorting bars of the exemplary embodiment of the LCD shown in FIG. 1.
Figure 8:
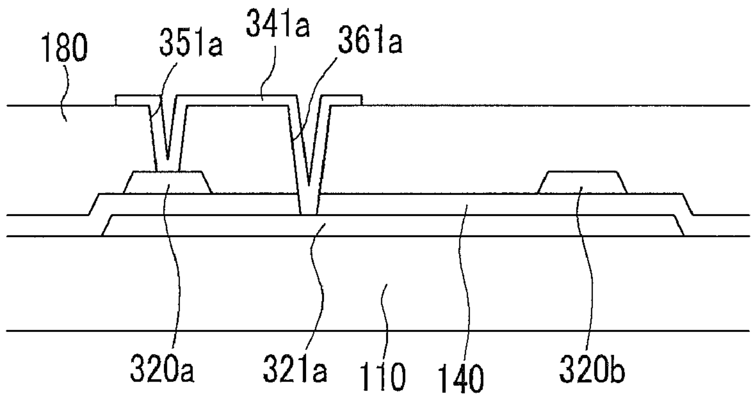
FIG. 8 is a cross-sectional view of the exemplary embodiment of the LCD taken along line VIII-VIII' of FIG. 7.

FIG. 7 is a view of exemplary gate shorting bars of the exemplary embodiments of the LCD shown in FIG. 1, and FIG. 8 is a cross-sectional view of the exemplary embodiment of the LCD taken along line VIII-VIII' of FIG. 7.

Gate pads PG1_a_-PGnb are formed on the insulating substrate 110, and gate extension lines 321_a_, 321_b_, 322_a_, 322_b_, . . . based on the same material as the gate lines 121_a_ and 121_b_ horizontally extend from the gate pads PG1_a_-PGnb. The gate pads PG1_a_-PGnb and gate extension lines 321_a_, 321_b_, 322_a_, 322_b_, . . . may be formed during the same manufacturing process as the gate lines 121_a_ and 121_b_. The gate insulating layer 140 is formed thereon, and gate shorting bars 320_a_ and 320_b_ are formed on the gate insulating layer 140 with the same material as the data lines 171 while proceeding in the vertical direction. The gate shorting bars 320_a_ and 320_b_ may be formed during the same manufacturing process as the data lines 171. The passivation layer 180 is formed on the gate shorting bars 320_a_ and 320_b_.

Contact holes 351_a_, 352_a_, . . . exposing the first gate shorting bar 320_a_ and contact holes 351_b_, 352_b_, . . . exposing the second gate shorting bar 320_b_ are formed through the passivation layer 180. Contact holes 361_a_, 361_b_, 362_a_, 362_b_, . . . exposing the gate extension lines 321_a_, 321_b_, 322_a_, 322_b_, . . . are formed through the passivation layer 180 and the gate insulating layer 140.

Connectors 341_a_, 341_b_, 342_a_, 342_b_, . . . are formed on the passivation layer 180 with ITO or IZO. The connectors 341_a_, 341_b_, 342_a_, 342_b_, . . . may be formed during the same manufacturing process as forming the pixel electrodes 190. The first connectors 341_a_, 342_a_, . . . physico-electrically connect the first gate shorting bar 320_a_ to the first gate extension lines 321_a_, 322_a_, . . . through the first contact holes 351_a_ and 361_a_, 352_a_ and 362_a_, . . . , respectively. The second connectors 341_b_, 342_b_, . . . physico-electrically connect the second gate shorting bar 320_b_ to the second gate extension lines 321_b_, 322_b_, . . . through the second contact holes 351_b_ and 361_b_, 352_b_ and 362_b_, . . . , respectively.

Meanwhile, the gate extension lines 321_a_, 321_b_, 322_a_, 322_b_, . . . may extend over the shorting bars 320_a_ and 320_b_ up to a static prevention subsidiary line (not shown), and be connected thereto.

An array test and a VI test of an exemplary embodiment of an LCD according to the present invention will be described with reference to FIGS. 9 and 10.

Figure 9:
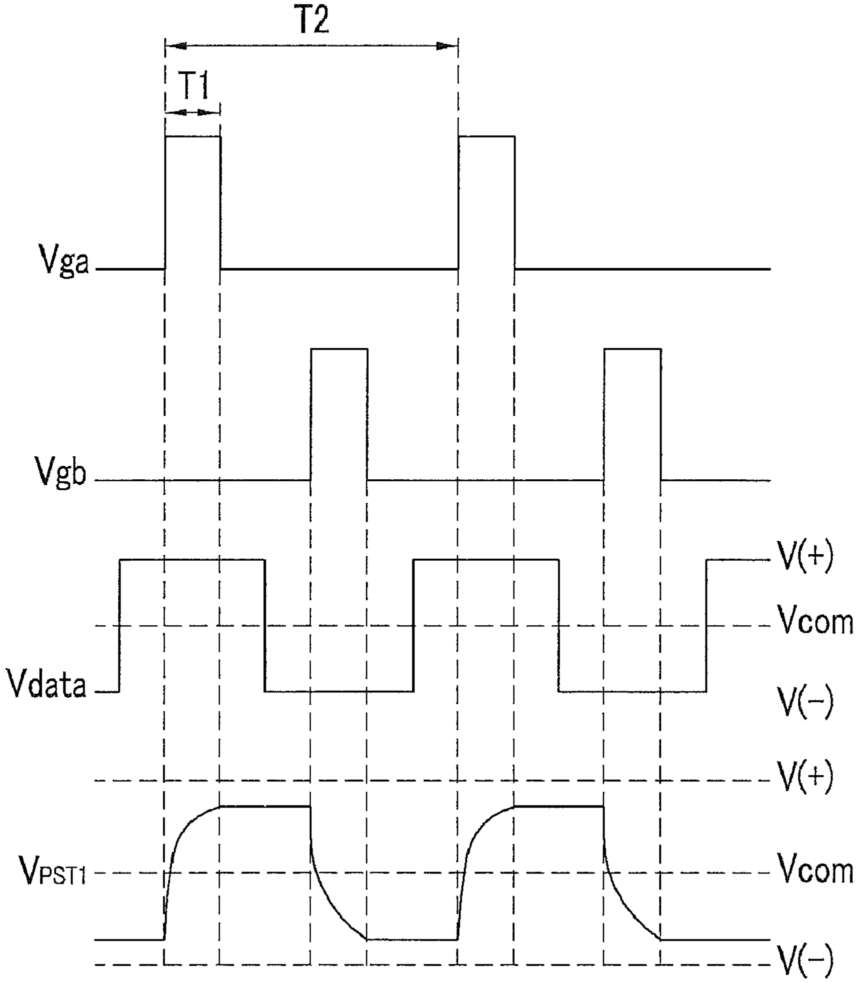
FIG. 9 is a test waveform diagram for an exemplary embodiment of an LCD according to the present invention.
Figure 10:
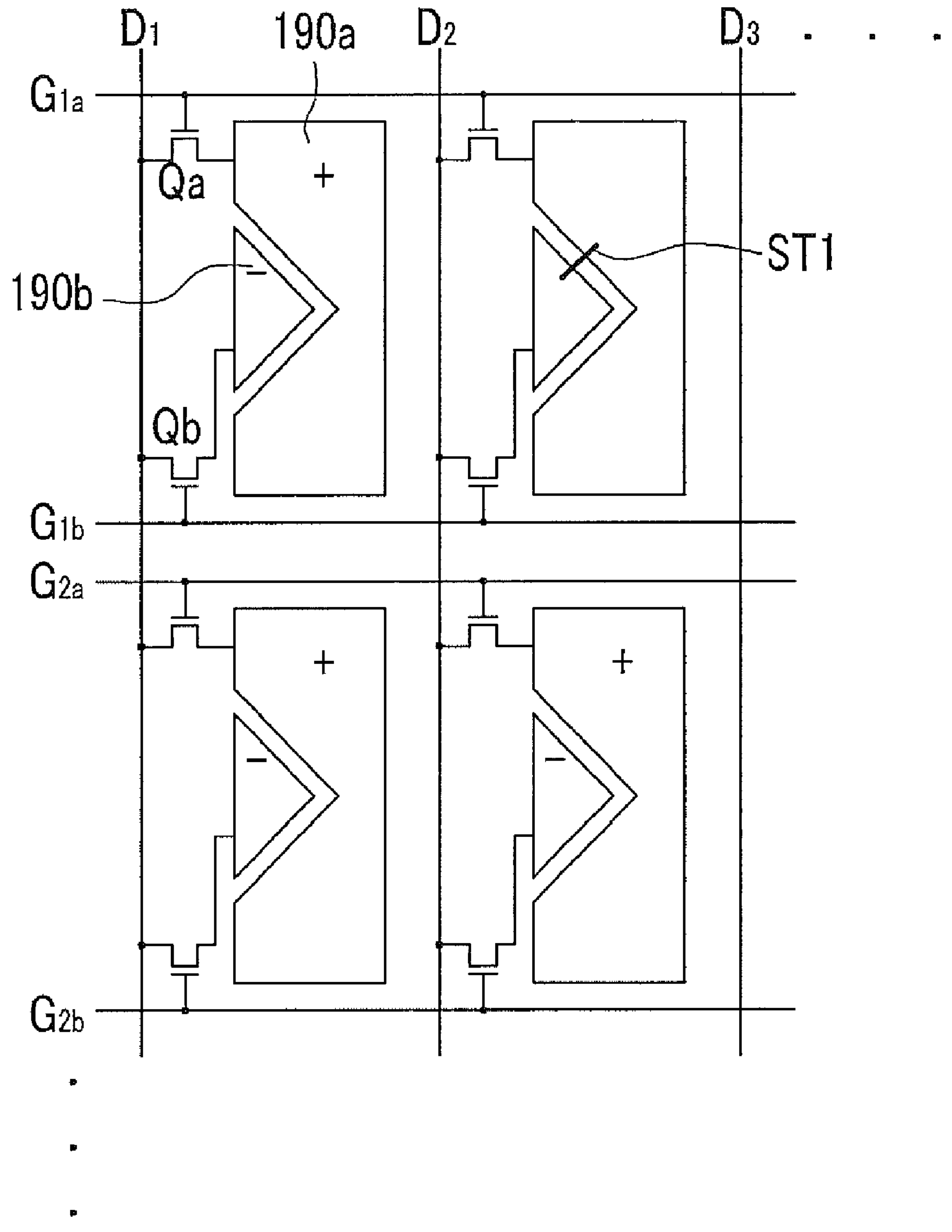
FIG. 10 illustrates the polarities of exemplary pixels of an exemplary embodiment of an LCD according to the present invention.

FIG. 9 is an exemplary test waveform diagram for an exemplary embodiment of an LCD according to the present invention, and FIG. 10 illustrates the polarities of exemplary pixels of an exemplary embodiment of an LCD according to the present invention.

As shown in FIG. 9, gate test signals Vga and Vgb are applied to the gate shorting bars 320_a_ and 320_b_ by taking T2 as a cycle. The gate test signals Vga and Vgb involve a phase difference of 180°. A positive data voltage V+ and a negative data voltage V− are alternately applied to the data shorting bars 310 by taking T2 as a cycle. The positive and negative polarities indicate the polarities of the data voltages Vdata with respect to the common voltage Vcom, and the dimensions of the positive and the negative data voltages V+ and V− are equal to each other, or at least substantially the same. In other words, the positive and negative data voltages V+ and V− each have the same, or at least substantially the same, amount of deviation from the common voltage Vcom. Under the application of a positive data voltage V+, the first gate test signal Vga is applied to turn on the first switching element Qa. While under the application of a negative data voltage V−, the second gate test signal Vgb is applied to turn on the second switching element Qb.

Then, as shown in FIG. 10, a positive pixel voltage is charged at the first sub-pixel electrodes 190_a_, and a negative pixel voltage at the second sub-pixel electrodes 190_b_. The positive and negative pixel voltages are continuously sustained at the first and second sub-pixel electrodes 190_a_ and 190_b_, respectively.

However, as shown in the pixel on the upper right side of FIG. 10, positive and negative voltages are alternately charged at the first and second sub-pixel electrodes interposing a bridge ST1 as with the voltage $V_{PST1}$ shown in FIG. 9. Accordingly, the bridge ST1 shown in FIG. 10, or any other bridge between the first and second sub-pixel electrodes at each pixel, can be easily identified by detecting the polarities of the respective sub-pixel electrodes through the array test.

Meanwhile, when the pulse width T1 of the gate test signals Vga and Vgb is properly controlled to slow the charging speed of the data voltages, voltages smaller than the positive and negative data voltages V+ and V− are charged at the first and second sub-pixel electrodes with the bridge. In other words, the dimension of the voltages charged at the first and second sub-pixel electrodes with the bridge is smaller than the dimension of the positive and negative data voltages V+ and V−. However, as the positive and negative data voltages V+ and V− are continuously applied to the normal first and second sub-pixel electrodes, the same voltages as the positive and negative data voltages V+ and V− are sustained there. Accordingly, the bridge between the first and second sub-pixel electrodes 190_a_ and 190_b_ can be easily identified by detecting the pixels differentiated in brightness from other pixels through the VI test.

If a bridge is formed between the first sub-pixel electrode 190_a_ and the shielding electrode 88, and a common voltage Vcom is applied to the shielding electrode 88, then a normal positive pixel voltage is not charged at the first sub-pixel electrode 190_a_. Accordingly, the presence of a bridge between the first sub-pixel electrode 190_a_ and the shielding electrode 88 can be easily identified through the array test and the VI test.

Another exemplary embodiment of an LCD and a test method thereof according to the present invention will be further described with reference to FIGS. 11 to 14.

Figure 11:
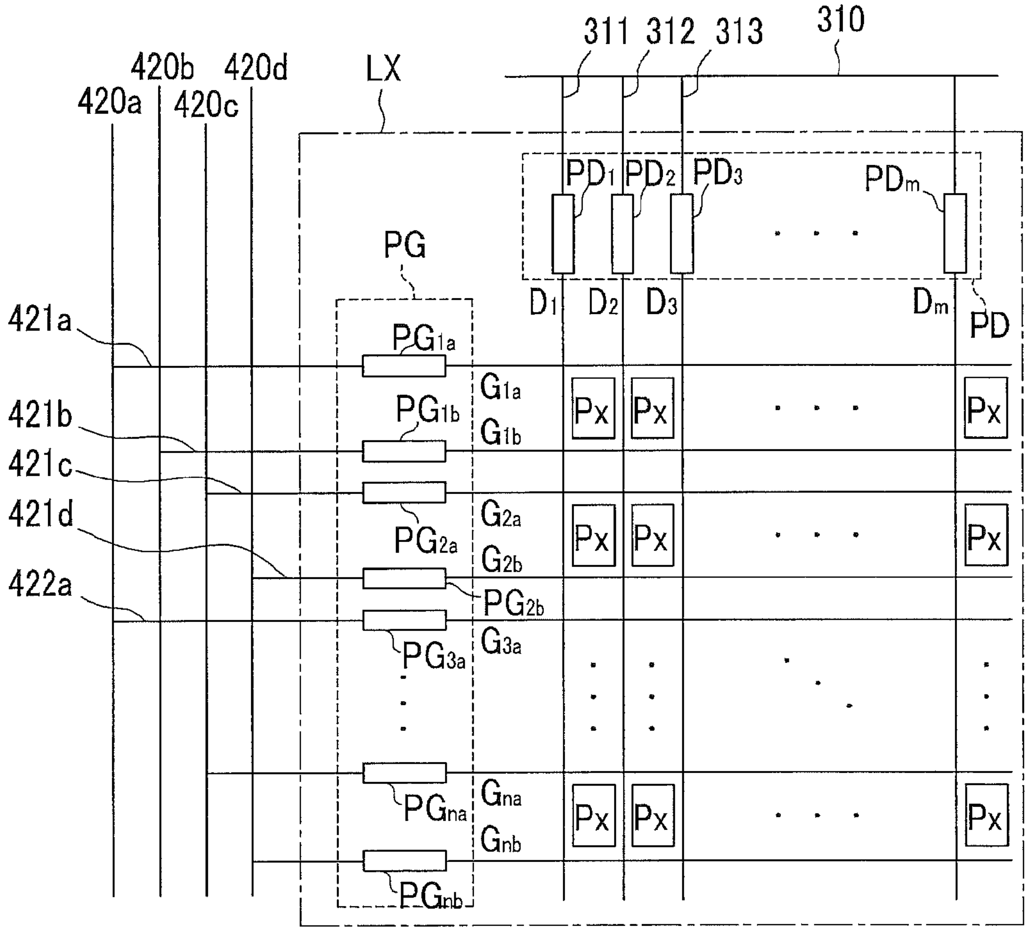
FIG. 11 is a schematic view of another exemplary embodiment of an LCD according to the present invention.
Figure 12:
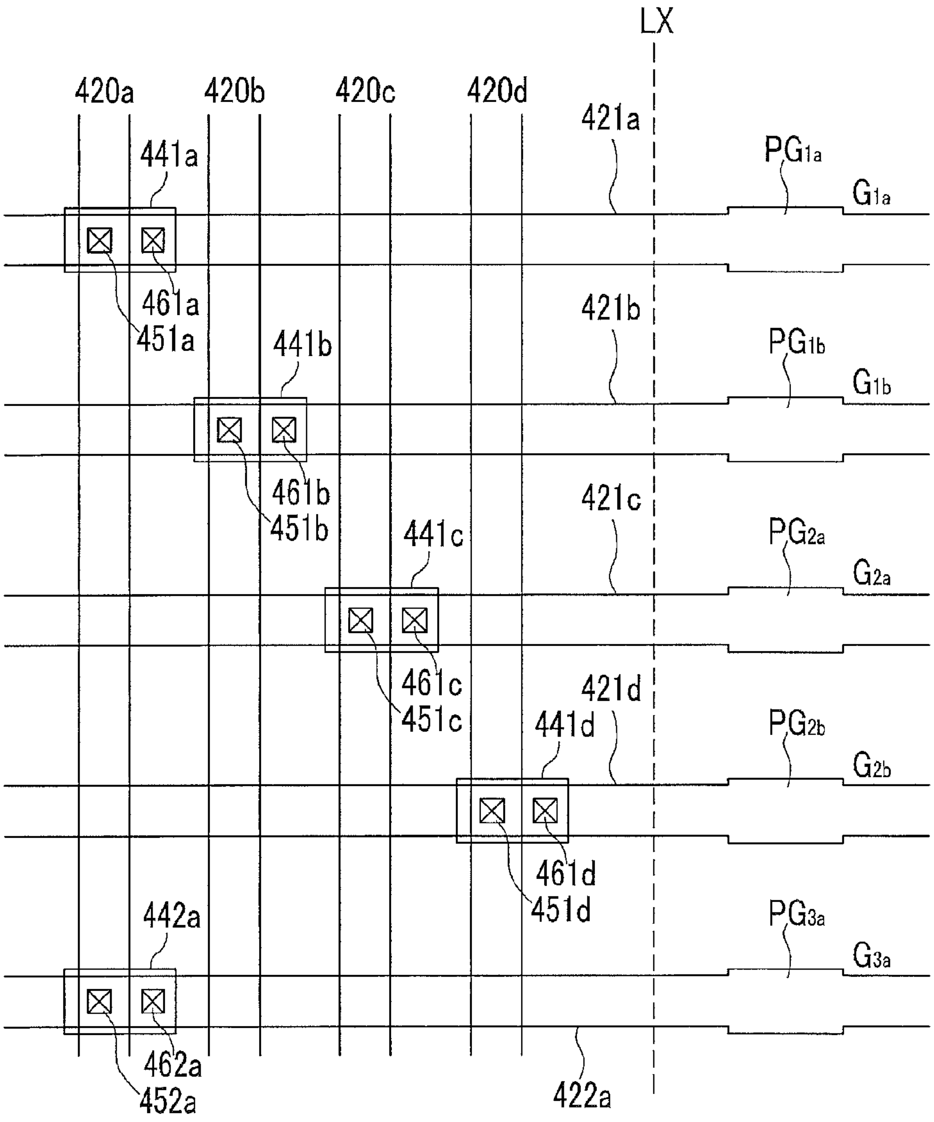
FIG. 12 is an amplified view of exemplary gate shorting bars of the exemplary embodiment of the LCD shown in FIG. 11.
Figure 13:
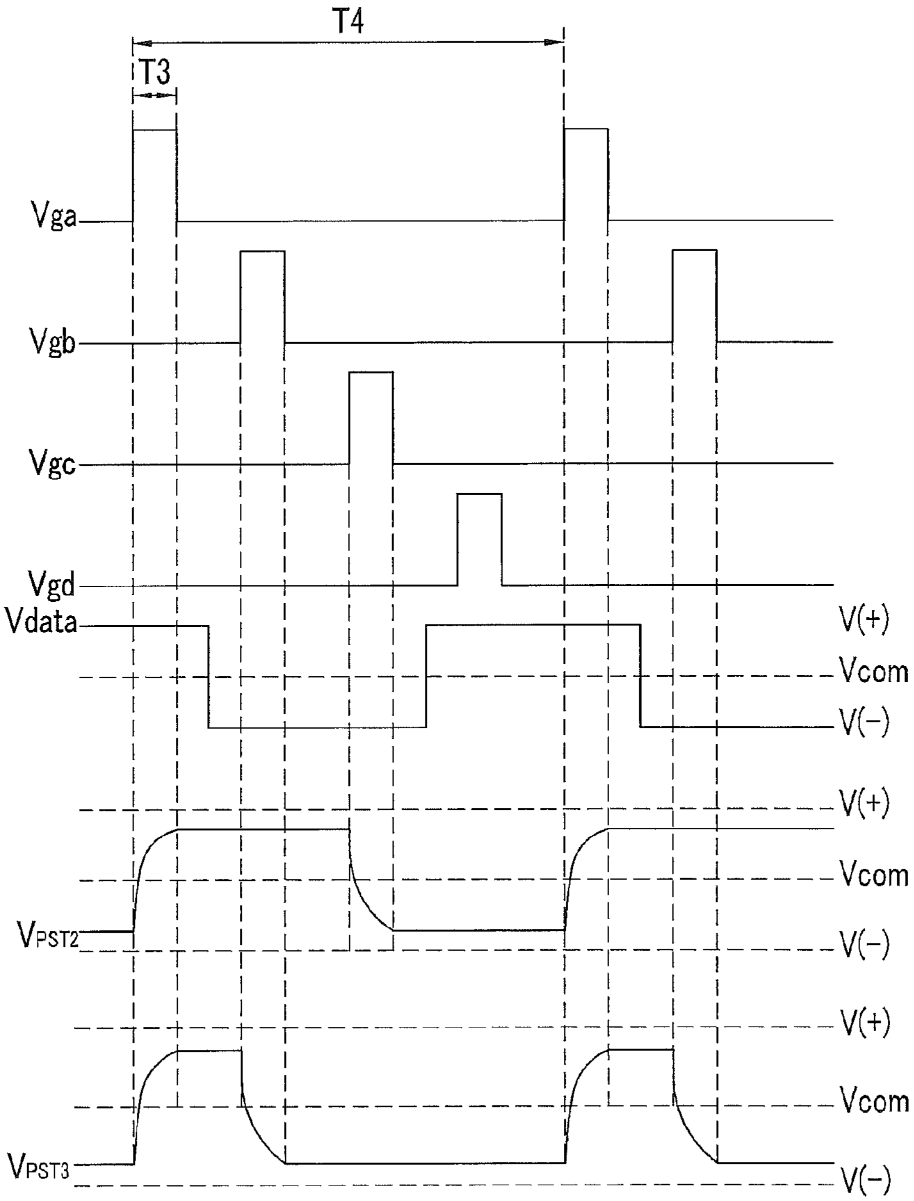
FIG. 13 is a test waveform diagram for another exemplary embodiment of an LCD according to the present invention.
Figure 14:
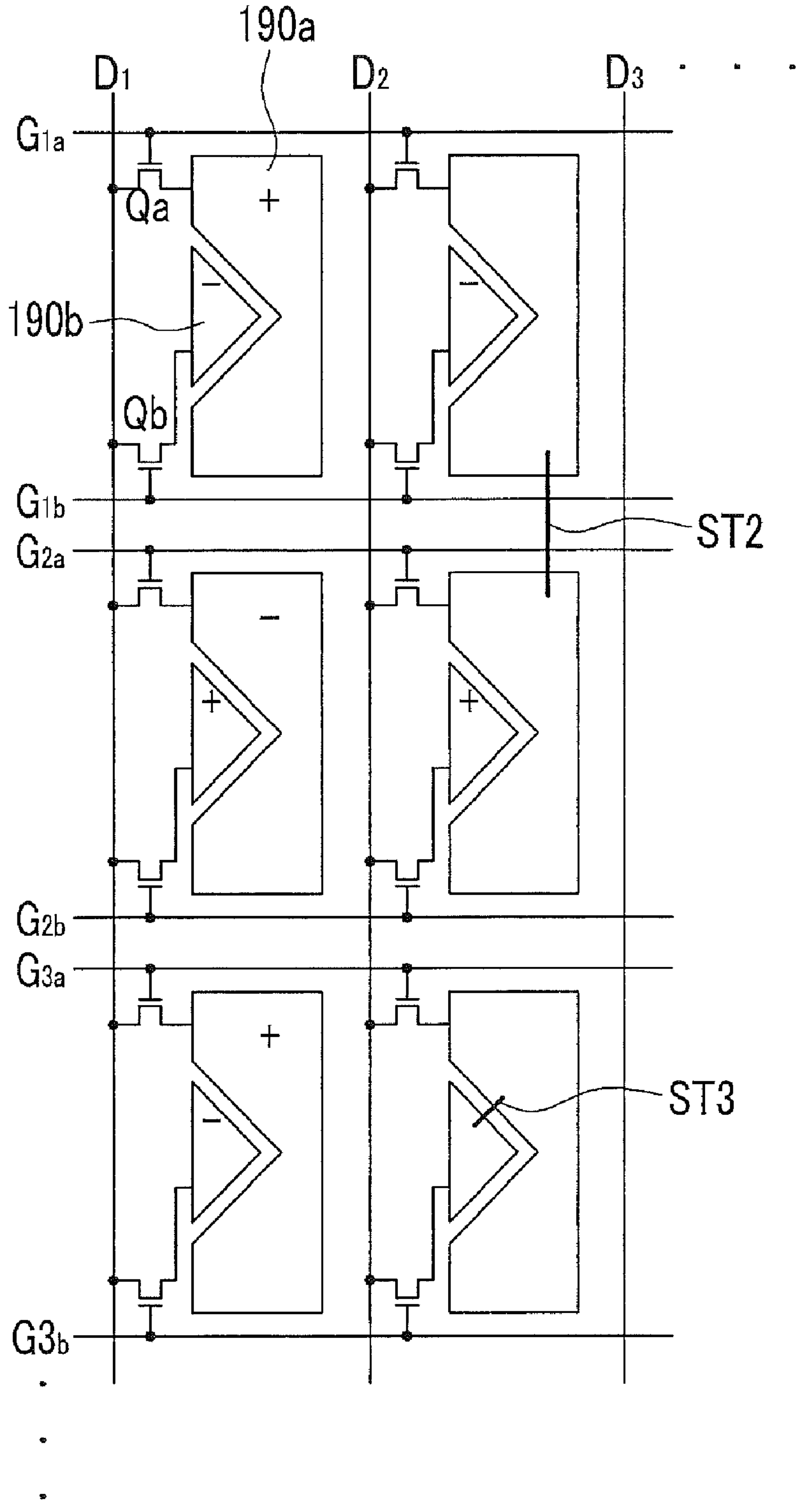
FIG. 14 illustrates the polarities of pixels of another exemplary embodiment of an LCD according to the present invention.

FIG. 11 is a schematic view of another exemplary embodiment of an LCD according to the present invention, and FIG. 12 is an amplified view of exemplary gate shorting bars of the exemplary embodiment of the LCD shown in FIG. 11. FIG. 13 is a test waveform diagram for another exemplary embodiment of an LCD according to the present invention, and FIG. 14 illustrates the polarities of exemplary pixels of another exemplary embodiment of an LCD according to the present invention.

The exemplary embodiment of the LCD described with respect to FIGS. 11 to 14 is quite similar to the LCD according to the previous embodiment, and hence, only the portions different from those of the previous embodiment will be further described.

As shown in FIG. 11, the portion of the LCD internal to the LX line is substantially the same as that of the LCD according to the previous embodiment. With the LCD according to the present embodiment, the shielding electrode 88 shown in FIG. 4 is omitted, and accordingly, the first and second pixel electrodes 190*a* and 190*b* may be overlapped with the data line 171, thereby enhancing the aperture ratio thereof.

Furthermore, the data shorting bar 310 according to the present embodiment is the same as that according to the previous embodiment. However, the LCD according to the present embodiment includes four gate shorting bars 420*a*-420*d* connected to gate pads PG1*a*-PGnb, instead of two gate shorting bars 320*a* and 320*b* as in the previous embodiment.

The gate pads PG1*a*-PGnb are sequentially connected to the gate shorting bars 420*a*-420*d* by fours. That is, the gate pads PG1*a*, PG1*b*, PG2*a*, and PG2*b* are connected to the gate shorting bars 420*a*, 420*b*, 420*c*, and 420*d* through gate extension lines 421*a*, 421*b*, 421*c*, and 421*d*, respectively. The next set of gate pads PG3*a*, . . . are connected to the gate shorting bars 420*a*, 420*b*, 420*c*, and 420*d* through the gate extension lines 422*a*, . . . , respectively, in the same manner, and so on for the remainder of the gate pads PG.

As shown in FIG. 12, the interconnection structure of the gate shorting bars 420*a*-420*d* and the gate extension lines are substantially the same as that of the gate shorting bars 320*a* and 320*b* and the gate extension lines shown in FIGS. 7 and 8 except that the number of gate shorting bars 420*a*-420*d* is increased to four, and the connection order thereof with the gate pads PG1*a*-PGnb is differentiated. In other words, every fourth gate extension line is connected to the same gate shorting bar.

As shown in FIG. 13, gate test signals Vga-Vgd are applied to the gate shorting bars 420*a*-420*d*, and thus to the gate lines, by taking T4 as a cycle. The gate test signals Vga-Vgd sequentially involve a phase difference of 90°. The positive data voltage V+ and the negative data voltage V− are alternately applied to the data shorting bar 310, and thus to the data lines, by taking T4 as a cycle.

Under the application of a positive data voltage V+ to the data lines, the first and fourth gate test signals Vga and Vgd are applied to the gate lines to turn on the first switching elements Qa at the odd-numbered pixel rows and the second switching elements Qb at the even-numbered pixel rows, while under the application of a negative data voltage V− to the data lines, the second and third gate test signals Vgb and Vgc are applied to the gate lines to turn on the second switching elements Qb at the odd-numbered pixel rows and the first switching elements Qa at the even-numbered pixel rows.

Then, as shown in FIG. 14, a positive pixel voltage is charged at the first sub-pixel electrodes 190*a* at the odd-numbered pixel rows, and a negative pixel voltage is charged at the second sub-pixel electrodes 190*b* at the odd-numbered pixel rows. Furthermore, a negative pixel voltage is charged at the first sub-pixel electrodes 190*a* at the even-numbed pixel rows, and a positive pixel voltage is charged at the second sub-pixel electrodes 190*b* at the even-numbered pixel rows. The once-charged positive or negative pixel voltage is continuously sustained at the respective sub-pixel electrodes 190*a* and 190*b* that do not have any bridges interposed thereon.

However, as shown in the right top portion of FIG. 14, positive and negative voltages are alternately charged at the two first sub-pixel electrodes 190*a* within adjacent pixels interposing a bridge ST2 as with the voltage $V_{PST2}$ shown in FIG. 13. Furthermore, as shown in the right bottom of FIG. 14, positive and negative voltages are alternately charged at the first and second sub-pixel electrodes 190*a* and 190*b* within a same pixel interposing a bridge ST3 as with the voltage $V_{PST3}$ shown in FIG. 13. Accordingly, the bridge ST3 as shown in FIG. 14, or any other bridge that may exist between the first and second sub-pixel electrodes 190*a* and 190*b* at each pixel, and the bridge ST2 as shown in FIG. 14, or any other bridge that may exist between the two neighboring first sub-pixel electrodes 190*a* can be easily identified by detecting the polarity of the respective sub-pixel electrodes through the array test.

When the pulse width T3 of the gate test signals Vga-Vgd is properly controlled to slow the charging speed of the data voltages, voltages smaller than the positive and negative data voltages V+ and V− are charged at the two first sub-pixel electrodes 190*a* with the bridge, and voltages smaller than the positive and negative data voltages V+ and V− are also charged at the first and second sub-pixel electrodes 190*a* and 190*b* with the bridge. In other words, the dimension of the voltages charged at the first and second sub-pixel electrodes with the bridge is smaller than the dimension of the positive and negative data voltages V+ and V−. Accordingly, any bridge between the first sub-pixel electrodes 190*a* and any bridge between the first and second sub-pixel electrodes 190*a* and 190*b* can be easily identified by detecting the pixels differentiated in brightness from other pixels through the VI test.

While it has been described that the exemplary embodiments of the LCD according to the present invention have one data shorting bar, it should be understood that the LCD may alternatively include a plurality of data shorting bars, for instance, two or three data shorting bars. As with the embodiments of the LCD that include the plurality of gate shorting bars, the array test and the VI test can also be made in the embodiments of the LCD having the plurality of data shorting bars.

Another exemplary embodiment of an LCD according to the present invention will now be described with reference to FIGS. 15 and 16.

Figure 15:
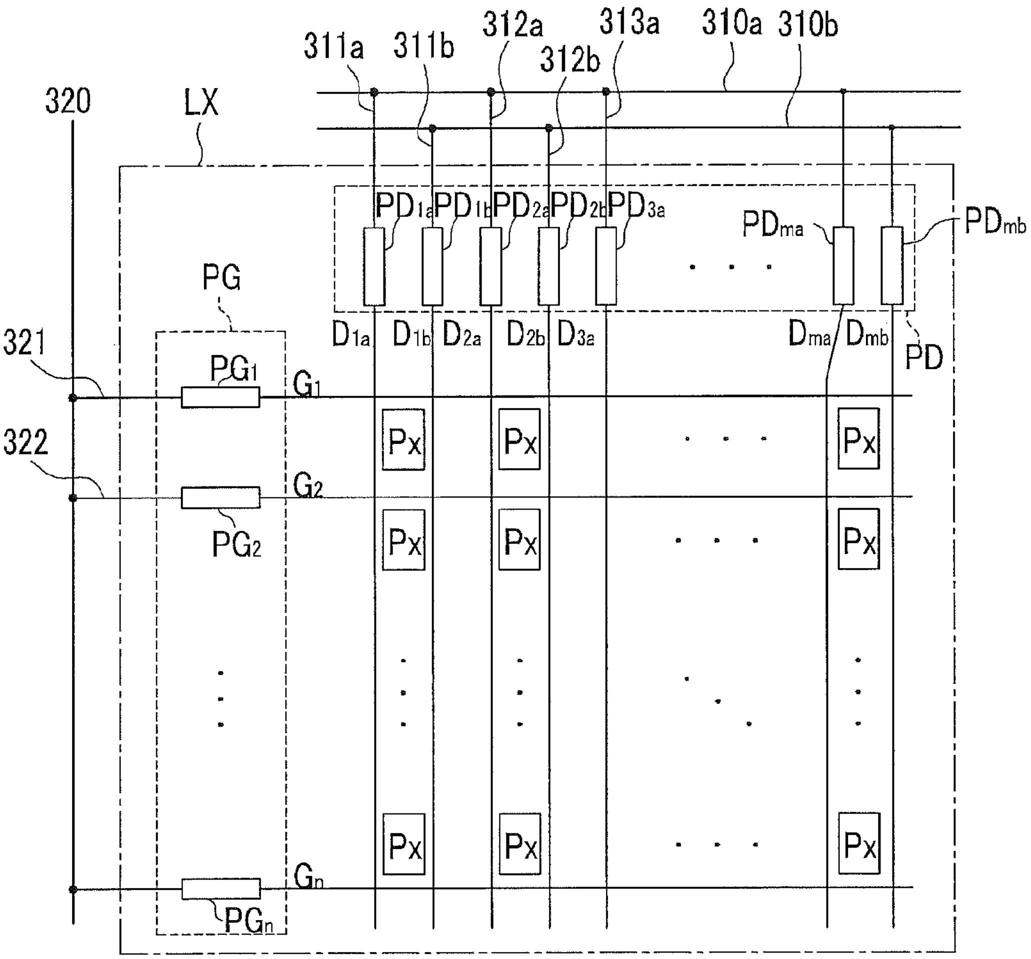
FIG. 15 is a schematic view of another exemplary embodiment of an LCD according to the present invention.
Figure 16:
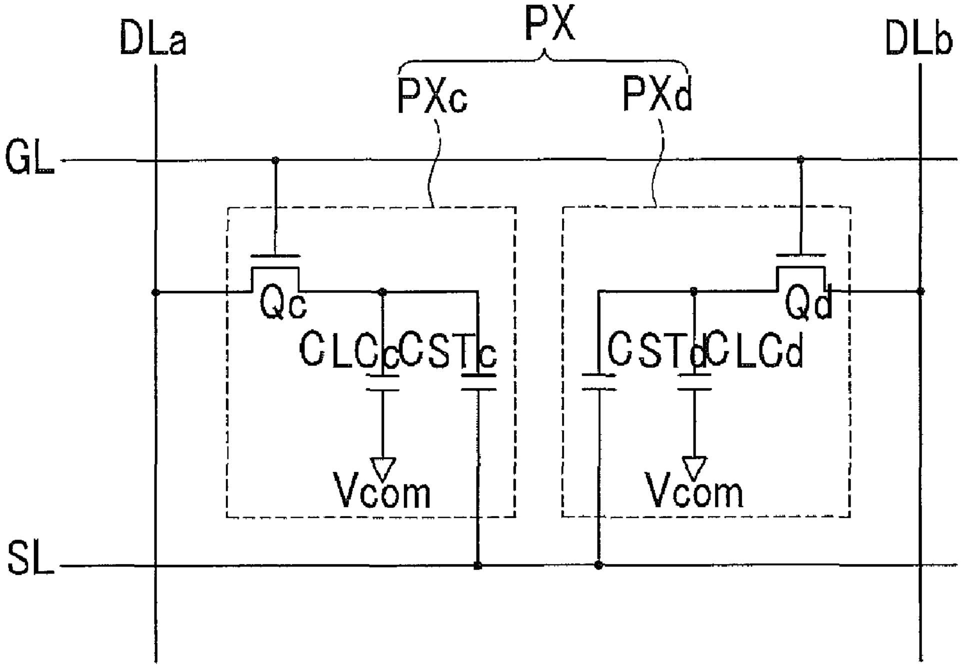
FIG. 16 is an equivalent circuit diagram of an exemplary pixel of another exemplary embodiment of an LCD according to the present invention.

FIG. 15 is a schematic view of another exemplary embodiment of an LCD according to the present invention, and FIG. 16 is an equivalent circuit diagram of an exemplary pixel of another exemplary embodiment of an LCD according to the present invention.

As shown in FIG. 15, an LCD includes a liquid crystal panel assembly, which includes, from the equivalent circuit perspective, a plurality of display signal lines G1-Gn and D1*a*-Dmb and a plurality of pixels PX connected to those display signal lines and arranged in the form of a matrix.

The display signal lines G1-Gn and D1*a*-Dmb include a plurality of gate lines G1-Gn for transmitting gate signals, and data lines D1*a*-Dmb for transmitting data signals. The gate lines G1-Gn extend in the pixel row direction substantially parallel to each other in a first direction, and the data lines D1*a*-Dmb extend in the pixel column direction substantially parallel to each other in a second direction. The first direction may be substantially perpendicular to the second direction.

The liquid crystal panel assembly includes gate pads PG1-PGn connected to the gate lines G1-Gn, respectively, and data pads PD1*a*-PDmb connected to the data lines D1*a*-Dmb, respectively, such that each gate line G1-Gn is connected to one gate pad PG and each data line D1*a*-Dmb is connected to one data pad PD. Gate and data shorting bars 320, and 310*a* and 310*b* are connected to the gate lines G1-Gn and the data lines D1*a*-Dmb, respectively.

The gate shorting bar 320 is connected to the gate pads PG1, PG2, . . . through gate extension lines 321, 322, . . . . Accordingly, the respective gate lines G1-Gn are connected to each other via the gate shorting bar 320. The gate shorting bar 320 may extend substantially perpendicular to the gate lines G1-Gn, and substantially parallel to the data lines D1*a*-Dmb.

The first data shorting bar 310*a* is connected to the first data pads PD1*a*, PD2*a*, PD3*a*, . . . via the first data extension lines 311*a*, 312*a*, 313*a*, . . . , and the second data shorting bar 310*b* is connected to the second data pads PD1*b*, PD2*b*, . . . via the second data extension lines 311*b*, 312*b*, . . . . Accordingly, the respective first data lines D1*a*-Dma are connected to each other via the data shorting bar 310*a*, and the respective second data lines D1*b*-Dmb are connected to each other via the data shorting bar 310*b*. The data shorting bars 310*a* and 310*b* may extend substantially perpendicular to the data lines D1*a*-Dmb, and substantially parallel to the gate lines G1-Gn.

Separate pads (not shown) are provided at the end portions of the gate shorting bar 320 and the data shorting bars 310*a* and 310*b* to apply various kinds of test signals, as will be further described below.

After the gate shorting bar 320 and the data shorting bars 310*a* and 310*b* undergo several tests, they are then removed along the LX line thereof. That is, elements within an interior of the LX periphery are retained for the LCD, and elements outside of the LX periphery, such as the gate shorting bar 320 and the data shorting bars 310*a* and 310*b*, are removed. Consequently, by removal of the shorting bars 320, 310*a*, and 310*b*, the gate lines G1-Gn are separated from the data lines D1*a*-Dmb. A gate driver (not shown) and a data driver (not shown) are connected to the gate and data pads PG1-PGn and PD1*a*-PDmb as external devices to apply gate and data signals to the gate and data lines G1-Gn and D1*a*-Dmb. However, in the case that the gate driver is integrated on the liquid crystal panel assembly, the gate pads may be omitted, and gate extension lines 321, 322, . . . extend from the gate driver.

FIG. 16 illustrates display signal lines and an equivalent circuit at one exemplary pixel PX. The display signal lines include gate lines indicated by GL, data lines indicated by DLa and DLb, and storage electrode lines SL proceeding substantially parallel to the gate lines GL. Thus, in contrast to the previous embodiments that included two gate lines GLa and GLb and a single data line DL per pixel, this embodiment includes a single gate line GL and a pair of data lines DLa and DLb per pixel.

The respective pixels PX include a pair of sub-pixels PXc and PXd, and the respective sub-pixels PXc and PXd include switching elements Qc and Qd connected to the relevant gate and data lines GL, and DLa, and DLb, and liquid crystal capacitors $C_{LCc}$ and $C_{LCd}$ and storage capacitors $C_{STc}$ and $C_{STd}$ connected to those switching elements. In an alternative embodiment, the storage capacitors $C_{STc}$ and $C_{STd}$ may be omitted, and in such a case, the storage electrode line SL is dispensed with.

As shown in FIGS. 15 and 16, all the gate lines GL are connected to the gate shorting bar 320, all the first data lines DLa are connected to the first data shorting bar 310*a*, and all the second data lines DLb are connected to the second data shorting bar 310*b*. Accordingly, the same signal can be applied to the respective first sub-pixels PXc, and the same signal that is different from the signal applied to the first sub-pixels PXc can be applied to the respective second sub-pixels PXd.

As the respective sub-pixels PXc and PXd are substantially the same as the sub-pixels shown in FIG. 3, a detailed description thereof will be omitted.

The structure of the LCD will now be further described with reference to FIGS. 17 and 18.

Figure 17:
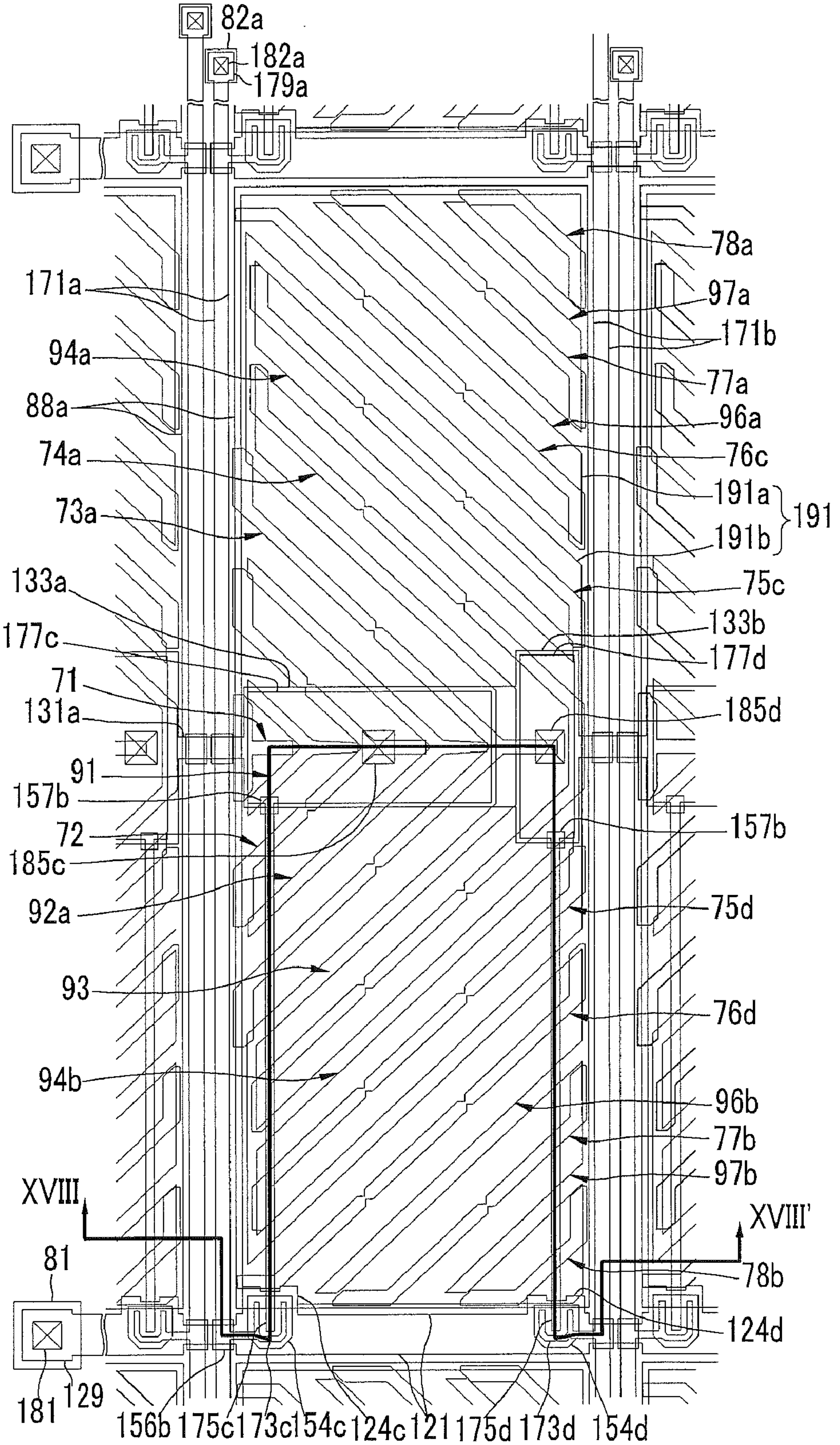
FIG. 17 is a plan view of another exemplary embodiment of an LCD according to the present invention.
Figure 18:
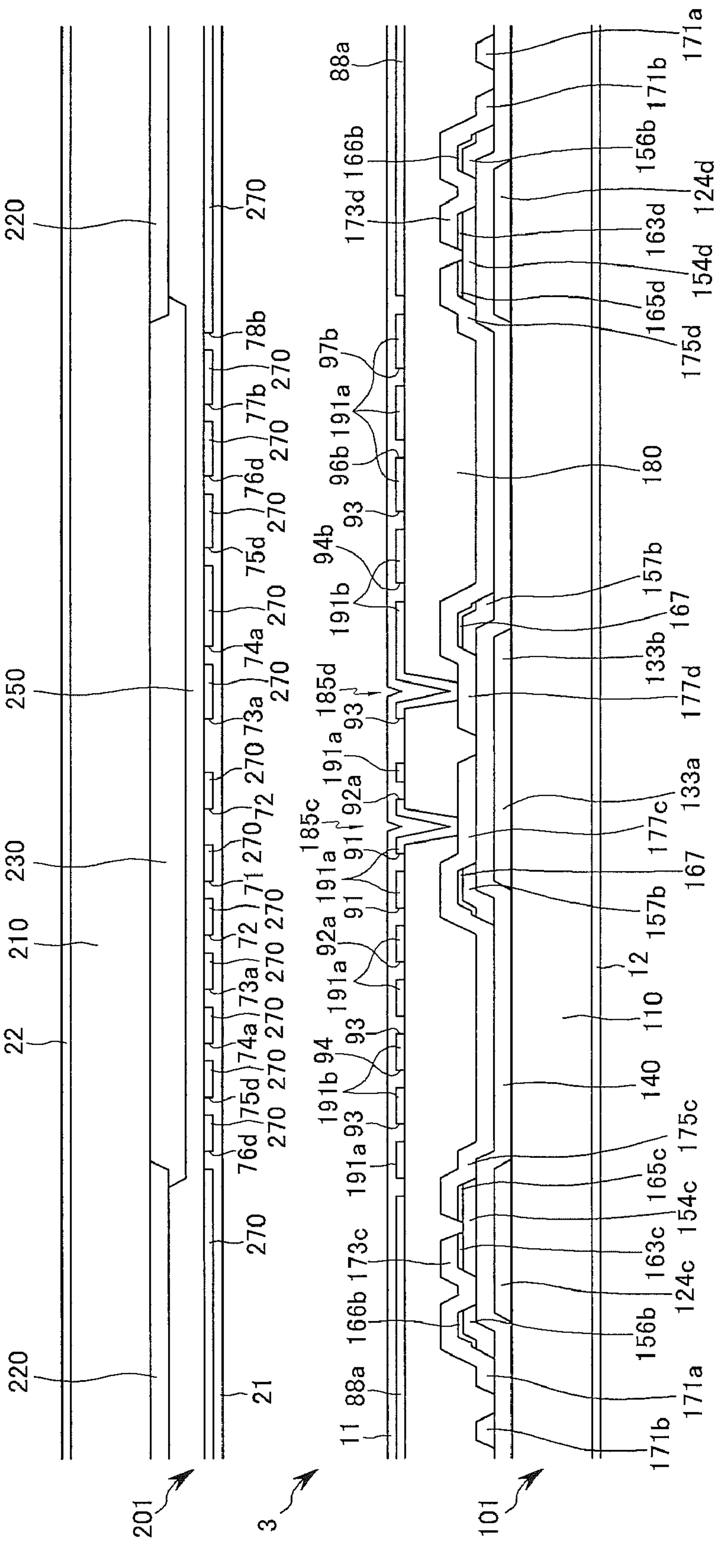
FIG. 18 is a cross sectional view of the exemplary embodiment of the LCD taken along line XVIII-XVIII' of FIG. 17.

FIG. 17 is a plan view of another exemplary embodiment of an LCD according to the present invention, and FIG. 18 is a cross-sectional view of the exemplary embodiments of the LCD taken along line XVIII-XVIII' of FIG. 17.

As shown in FIGS. 17 and 18, the LCD includes a lower panel 101, an upper panel 201 facing the lower panel 101, and a liquid crystal layer 3 disposed between those panels 101 and 201. The lower panel 101 may also be known as a TFT panel or first panel, and the upper panel 201 may also be known as a common electrode panel, a color filter panel, or a second panel.

First, the lower panel 101 will be described.

A plurality of gate lines 121 and a plurality of storage electrode lines 131*a* are formed on an insulating substrate 110 based on transparent glass or plastic.

The gate lines 121 extend horizontally, such as in a transverse or first direction, and are separated from each other to transmit gate signals. The respective gate lines 121 have a plurality of protrusions forming gate electrodes 124*c* and 124*d*, and a wide area end portion 129 for making a connection with other layers or external devices.

The storage electrode lines 131*a* also extend horizontally, substantially parallel to the gate lines 121, and have a plurality of protrusions forming storage electrodes 133*a* and 133*b*. The storage electrodes 133*a* and 133*b* may be rectangular shaped and symmetrical to the storage electrode line 131*a*.

A gate insulating layer 140 is formed on the gate lines 121 and the storage electrode lines 131*a* and may be further formed over exposed portions of the insulating substrate 110. The gate insulating layer 140 may be made with silicon nitride (SiNx) or the like.

A plurality of island-shaped semiconductors 154*c*, 154*d*, 156*b*, and 157*b* are formed on the gate insulating layer 140 with hydrogenated a-Si or polycrystalline silicon. The semiconductors 154*c* and 154*d* are placed on the gate electrodes 124*c* and 124*d*, respectively.

A plurality of island-shaped ohmic contacts 163*c*, 163*d*, 165*c*, 165*d*, 166*b*, and 167 are formed on the semiconductors 154*c*, 154*d*, 156*b*, and 157*b* with n+ hydrogenated a-Si where n-type impurities such as silicide and phosphorous are doped at a high concentration. Pairs of the ohmic contacts 163*c* and 165*c* and ohmic contacts 163*d* and 165*d* are placed on the semiconductors 154*c* and 154*d*, and the other ohmic contacts 166*b* and 167 are placed on the semiconductors 156*b* and 157*b*, respectively.

A plurality of data lines 171*a* and 171*b*, and drain electrodes 175*c* and 175*d* separated from the data lines 171*a* and 171*b* are formed on the gate insulating layer 140 and the ohmic contacts 163*c*, 163*d*, 165*c*, 165*d*, 166*b*, and 167.

The data lines 171*a* and 171*b* extend vertically, such as in a longitudinal or second direction, such that they cross the gate lines 121 and storage electrode lines 131*a* to transmit data voltages. The data lines 171*a* and 171*b* are insulated from the gate lines 121 by the gate insulating layer 140 disposed there between. The data lines 171*a* and 171*b* include a plurality of source electrodes 173*c* and 173*d* and end portions 179*a* and 179*b* with an enlarged width to make a connection with other layers or external devices.

The first and second drain electrodes 175*c* and 175*d* are separated from the data lines 171*a* and 171*b*, and face the source electrodes 173*c* and 173*d* around the gate electrodes 124*c* and 124*d*, respectively. The first and second drain electrodes 175*c* and 175*d* have bar-shaped end portions placed over the semiconductors 154*c* and 154*d*, and wide area extensions 177*c* and 177*d* extended from the bar-shaped end portions and overlapped with the storage electrodes 133*a* and 133*b*. The bar-shaped end portions of the drain electrodes 175*c* and 175*d* are partially surrounded by the U-bent source electrodes 173*c* and 173*d*.

The first and second gate electrodes 124*c* and 124*d*, the first and second source electrodes 173*c* and 173*d*, and the first and second drain electrodes 175*c* and 175*d* form first and second TFTs Qc and Qd together with the semiconductors 154*c* and 154*d*. The channels of the TFTs Qc and Qd are formed on the semiconductors 154$c$ and 154$d$ between the first and second source electrodes 173$c$ and 173$d$ and the first and second drain electrodes 175$c$ and 175$d$, and between the ohmic contacts 163$c$, 163$d$ and 165$c$, 165$d$.

The ohmic contacts 163$c$, 163$d$, 165$c$, 165$d$, 166$b$, and 167 are only interposed between the underlying semiconductors 154$c$, 154$d$, 156$b$, and 157$b$ and the overlying data lines 171$a$ and 171$b$ and drain electrodes 175$c$ and 175$d$ to lower the contact resistance therebetween. The island-shaped semiconductors 154$c$ and 154$d$ have portions exposed through the source electrodes 173$c$ and 173$d$ and the drain electrodes 175$c$ and 175$d$, and the semiconductors 156$b$ and 157$b$ smooth the profile on the gate lines 121 and the storage electrode lines 131$a$ to thereby prevent the data lines 171$a$ and 171$b$ and the drain electrodes 175$c$ and 175$d$ from being cut.

A passivation layer 180 is formed on the data lines 171$a$ and 171$b$, the drain electrodes 175$c$ and 175$d$, and the exposed portions of the semiconductors 154$c$ and 154$d$. The passivation layer 180 may be further formed on exposed portions of the gate insulating layer 140 as shown.

A plurality of contact holes 185$c$, 185$d$, 182$a$, and 182$b$ are formed through the passivation layer 180 to expose the extensions 177$c$ and 177$d$ of the drain electrodes 175$c$ and 175$d$ and end portions 179$a$ and 179$b$ of the data lines 171$a$ and 171$b$, respectively. A plurality of contact holes 181 are formed through the passivation layer 180 and the gate insulating layer 140 to expose end portions 129 of the gate lines 121.

A plurality of pixel electrodes 191 with first and second sub-pixel electrodes 191$a$ and 191$b$, a plurality of shielding electrodes 88$a$, and a plurality of subsidiary contacts (contact assistants) 81, 82$a$, and 82$b$ are formed on the passivation layer 180. The plurality of pixel electrodes 191, plurality of shielding electrodes 88$a$, and plurality of subsidiary contacts 81, 82$a$, and 82$b$ may be formed with a transparent conductive material such as ITO and IZO, or a reflective conductive material such as aluminum for use in a reflective LCD.

The first and second sub-pixel electrodes 191$a$ and 191$b$ are physico-electrically connected to the first and second drain electrodes 175$c$ and 175$d$ through the contact holes 185$c$ and 185$d$ to receive data voltages from the first and second drain electrodes 175$c$ and 175$d$. Predetermined voltages different from each other are applied to a pair of sub-pixel electrodes 191$a$ and 191$b$ with respect to one input image signal, and the dimensions of the voltages may be determined depending upon the dimensions and shape of the sub-pixel electrodes 191$a$ and 191$b$. Furthermore, the areas of the sub-pixel electrodes 191$a$ and 191$b$ may differ from each other. The second sub-pixel electrode 191$b$ receives a higher voltage compared to the first sub-pixel electrode 191$a$, and is smaller in area than the first sub-pixel electrode 191$a$.

The sub-pixel electrodes 191$a$ and 191$b$ receiving the data voltage generate an electric field in association with the common electrode 270 of the opposing panel 200 supplied with a common voltage, to thereby determine the alignment of the liquid crystal molecules of the liquid crystal layer 3 between the two electrodes 191 and 270.

The respective sub-pixel electrodes 191$a$ and 191$b$ and the common electrode 270 form liquid crystal capacitors $C_{LCc}$ and $C_{LCd}$, and sustain the applied voltage even after the TFTs Qc and Qd turn off. The storage capacitors $C_{STc}$ and $C_{STd}$ connected to the liquid crystal capacitors $C_{LCc}$ and $C_{LCd}$ in parallel to reinforce the voltage storage capacity are formed by overlapping the first and second sub-pixel electrodes 191$a$ and 191$b$ and the extensions 177$c$ and 177$d$ of the drain electrodes 175$c$ and 175$d$ connected thereto with the storage electrodes 133$a$ and 133$b$.

A pair of first and second sub-pixel electrodes 191$a$ and 191$b$ forming a pixel electrode 191 engage with each other while interposing a gap 93 therebetween, and the pixel electrode 191 is roughly outlined as a rectangle. The second sub-pixel electrode 191$b$ is roughly formed as a rotated equilateral trapezoid having a trapezoid-hollowed bottom side, and is mostly surrounded by the first sub-pixel electrode 191$a$, that is, the second sub-pixel electrode 191$b$ is nested within the first sub-pixel electrode 191$a$. The first sub-pixel electrode 191$a$ has an upper trapezoid portion, a lower trapezoid portion, and a middle trapezoid portion, which are connected to each other at the left side thereof. The middle trapezoid portion of the first sub-pixel electrode 191$a$ is fitted into the hollowed bottom side of the second sub-pixel electrode 191$b$. The gap 93 between the first and second sub-pixel electrodes 191$a$ and 191$b$ roughly has two pairs of upper and lower inclined portions angled against the gate line 121 at roughly 45° with even widths, and three vertical portions substantially with even widths. For explanatory convenience, the gap 93 may also be referred to as a cutout.

The first sub-pixel electrode 191$a$ has cutouts 96$a$, 96$b$, 97$a$, and 97$b$ proceeding from the top side of the upper trapezoid portion and the bottom side of the lower trapezoid portion toward the right side thereof. The first sub-pixel electrode 191$a$ has cutouts 91 and 92$a$ proceeding along the storage electrode line 131$a$, and the cutouts 91 and 92$a$ have a horizontal portion horizontally proceeding from the center thereof and a pair of legs angled against the storage electrode line 131$a$ at about 45°. The second sub-pixel electrode 191$b$ has cutouts 94$a$ and 94$b$ proceeding from the left side to the right side. The cutouts 91, 92$a$, 94$a$, 94$b$, 96$a$, 96$b$, 97$a$, and 97$b$ are inversion-symmetrical to the storage electrode line 131$a$, and extend substantially perpendicular or parallel to each other while being angled against the gate line 121 at about 45°. That is, cutouts on an upper half of the pixel electrode 191 are arranged parallel to each other, cutouts on a lower half of the pixel electrode 191 are arranged parallel to each other, and cutouts on the upper half are arranged perpendicular to cutouts on the lower half. The upper half and the lower half of the pixel electrode 191 are partitioned into eight regions by way of the cutouts 91-97$b$.

While a particular arrangement has been illustrated and described, the number of division regions or cutouts may be varied depending on design factors such as pixel size, the length ratio of the horizontal to the vertical sides of the pixel electrode 191, and the kinds or characteristics of the liquid crystal layer 3.

Shielding electrodes 88$a$ have vertical portions proceeding along the data lines 171$a$ and 171$b$, and horizontal portions proceeding along the gate lines 121. The vertical portions completely cover the data lines 171$a$ and 171$b$, and the horizontal portions completely cover the gate lines 121.

The shielding electrodes 88$a$ shield the electric field between the data lines 171$a$ and 171$b$ and the pixel electrode 191 as well as between the data lines 171$a$ and 171$b$ and the common electrode 270 so that voltage distortion of the pixel electrode 191 and signal delay of the data voltages transmitted by the data lines 171$a$ and 171$b$ are reduced. Furthermore, the pixel electrode 191 and the shielding electrode 88$a$ should be spaced apart from each other by a distance to prevent short-circuiting thereof. Consequently, as the pixel electrode 191 extends far enough from the data lines 171$a$ and 171$b$ and the gate line 121, the parasitic capacitance therebetween is reduced.

The subsidiary contacts 81, 82*a*, and 82*b* are connected to the end portions 129 of the gate lines 121 and the end portions 179*a* and 179*b* of the data lines 171*a* and 171*b*, respectively. The subsidiary contacts 81, 82*a*, and 82*b* serve to reinforce the adhesion between the exposed end portions 129 of the gate lines 121 and the exposed end portions 179*a* and 179*b* of the data lines 171*a* and 171*b* and external devices, and protect them.

An alignment layer 11 is formed on the pixel electrode 191, the subsidiary contacts 81, 82*a*, and 82*b*, and the passivation layer 180 to align the liquid crystal layer 3.

The upper panel 201 will now be described.

A light blocking member 220, also termed a black matrix, a plurality of color filters 230, a cover layer 250, and a common electrode 270 are sequentially formed on an insulating substrate 210 based on transparent glass or plastic.

The common electrode 270 has multiple sets of cutouts 71, 72, 73*a*, 74*a*, 75*c*, 75*d*, 76*c*, 76*d*, 77*a*, 77*b*, 78*a*, and 78*b*.

Each set of the cutouts 71-78 faces one pixel electrode 191, and includes middle cutouts 71, 72, 73*a*, and 74*a*, upper cutouts 75*c*, 76*c*, 77*a*, and 78*a*, and lower cutouts 75*d*, 76*d*, 77*b*, and 78*b*. The cutouts 71-78*b* are arranged on the common electrode 270 corresponding to positions at the left-sided center of the pixel electrode 191, between the neighboring cutouts of the pixel electrode 191, and between the outermost cutouts 97*a* and 97*b* and the corners of the pixel electrode 191. Furthermore, the cutouts 72-78*b* include at least one inclined portion proceeding parallel to the cutouts 91-97*b* of the pixel electrode 191.

The lower and upper cutouts 75*c*-78*b* include inclined portions proceeding along the common electrode 270 from positions corresponding to the right side of the pixel electrode 191 toward the bottom or top side, and horizontal and vertical portions proceeding from positions corresponding to the respective ends of the inclined portions along the sides of the pixel electrode 191 while being overlapped therewith and obtuse-angled against the inclined portions.

The first middle cutout 71 has a vertical portion on the common electrode 270 extending along a position corresponding to the left side of the pixel electrode 191 while being overlapped therewith, and a horizontal portion extending from the center of the vertical portion along the storage electrode line 131*a*. The second and third middle cutouts 72 and 73*a* include a horizontal portion on the common electrode 270 extending along a position corresponding to the storage electrode line 131*a*, a pair of inclined portions extending from the horizontal portion toward a position corresponding to the left side of the pixel electrode 191 oblique to the storage electrode line 131*a*, and vertical end portions extending from the ends of the inclined portions along positions corresponding to the left side of the pixel electrode 191 while being overlapped therewith and obtuse-angled against the inclined portions. The fourth middle cutout 74*a* includes a vertical portion on the common electrode 270 extending along a position corresponding to the right side of the pixel electrode 191 while being overlapped therewith, a pair of inclined portions extending from the respective ends of the vertical portion toward positions corresponding to the left side of the pixel electrode 191, and vertical end portions extending from the ends of the inclined portions along positions on the common electrode 270 corresponding to the left side of the second sub-pixel electrode 191*b* while being overlapped therewith and obtuse-angled against the inclined portions.

Triangle-shaped notches are formed at the inclined portions of the cutouts 72-77*b*. Alternatively, the notches may be formed with various shapes such as a rectangle, a trapezoid, and a semicircle, and with a convex or concave shape.

While a particular arrangement has been illustrated and described, the number of the cutouts on the common electrode 270 may be varied depending upon design factors.

An alignment layer 21 is formed on the common electrode 270 and the cover layer 250 to align the liquid crystal layer 3.

Polarizing plates 12 and 22 are attached to the outer surfaces of the display panels 101 and 201. In the case of a reflection type of LCD, one of the two polarizing plates 12 and 22 may be omitted.

Many features of the previous embodiments of the LCD described with reference to FIGS. 4 to 6 may also be applied to the LCD shown in FIGS. 17 and 18.

Exemplary data shorting bars according to the present embodiment will be further described with reference to FIGS. 19 and 20.

Figure 19:
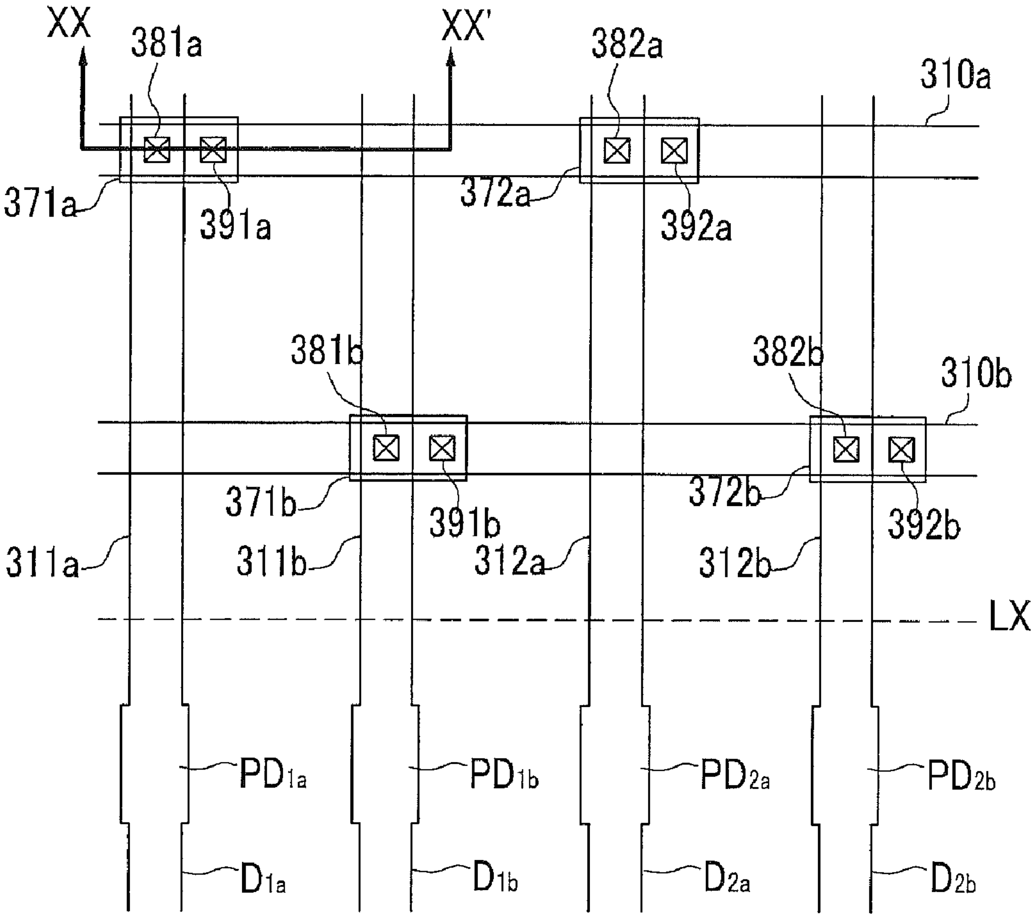
FIG. 19 is an amplified view of exemplary data shorting bars of the exemplary embodiment of the LCD shown in FIG. 15.
Figure 20:
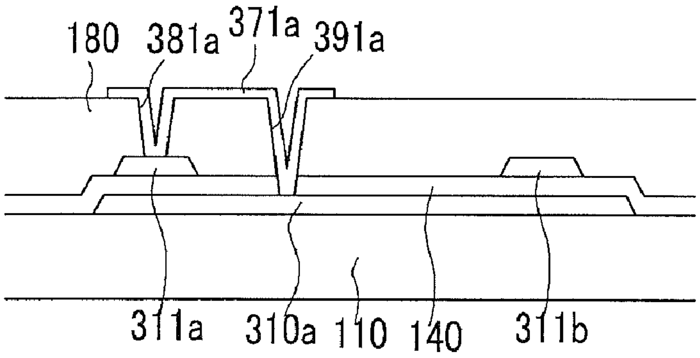
FIG. 20 is a cross-sectional view of the exemplary embodiment of the LCD taken along line XX-XX' of FIG. 19.

FIG. 19 is an amplified view of exemplary data shorting bars of the exemplary embodiment of the LCD shown in FIG. 15, and FIG. 20 is a cross-sectional view of the exemplary embodiment of the LCD taken along line XX-XX' of FIG. 19.

Data shorting bars 310*a* and 310*b* are formed on the insulating substrate 110 of the same material as the gate line 121, and the gate insulating layer 140 is formed thereon. The data shorting bars 310*a* and 310*b* may be formed during the same manufacturing process as the gate line 121. Data pads PD1*a*-PDmb are formed on the gate insulating layer 140, and data extension lines 311*a*, 311*b*, 312*a*, 312*b*, . . . vertically extend from the data pads with the same material as the data lines 171*a* and 171*b*. The data pads PD1*a*-PDmb and data extension lines 311*a*, 311*b*, 312*a*, 312*b*, . . . may be formed during the same manufacturing process as the data lines 171*a* and 171*b*. The passivation layer 180 is formed on the data extension lines 311*a*, 311*b*, 312*a*, 312*b*, . . . .

Contact holes 381*a*, 381*b*, 382*a*, 382*b*, . . . are formed through the passivation layer 180 to expose the data extension lines 311*a*, 311*b*, 312*a*, 312*b*, . . . . Contact holes 391*a*, 392*a*, . . . exposing the first data shorting bar 310*a* and contact holes 391*b*, 392*b*, . . . exposing the second data shorting bar 310*b* are formed through the passivation layer 180 and the gate insulating layer 140.

Connectors 371*a*, 371*b*, 372*a*, 372*b*, . . . are formed on the passivation layer 180 with ITO or IZO. The connectors 371*a*, 371*b*, 372*a*, 372*b*, . . . may be formed during the same manufacturing process as forming the pixel electrodes 191. The first connectors 371*a*, 372*a*, . . . physico-electrically interconnect the first data shorting bar 310*a* and the data extension lines 311*a*, 312*a*, . . . through the first contact holes 381*a*, 391*a*, 382*a*, 392*a*, . . . , and the second connectors 371*b*, 372*b*, . . . physico-electrically interconnect the second data shorting bar 310*b* and the data extension lines 311*b*, 312*b*, . . . through the second contact holes 381*b*, 391*b*, 382*b*, 392*b*, . . . , respectively.

Meanwhile, the data extension lines 311*a*, 311*b*, 312*a*, 312*b*, . . . may extend over the data shorting bars 310*a* and 310*b* such that they are connected to an antistatic subsidiary line (not shown).

A VI test for an exemplary embodiment of an LCD according to the present invention will now be described with reference to FIGS. 21 and 22.

Figure 21:
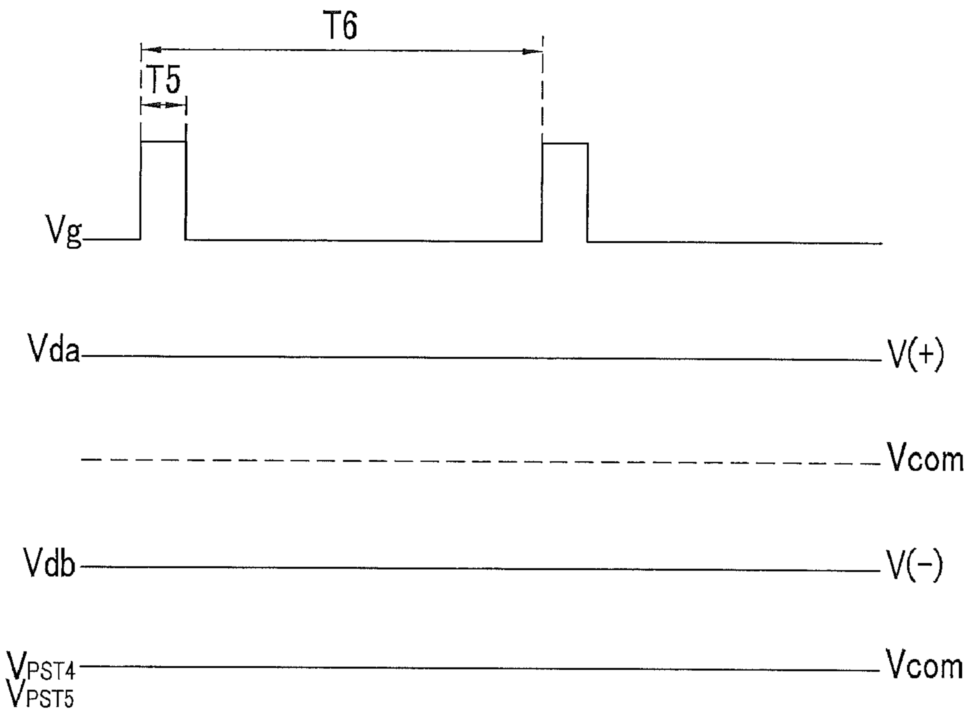
FIG. 21 is a test waveform diagram for another exemplary embodiment of an LCD according to the present invention.
Figure 22:
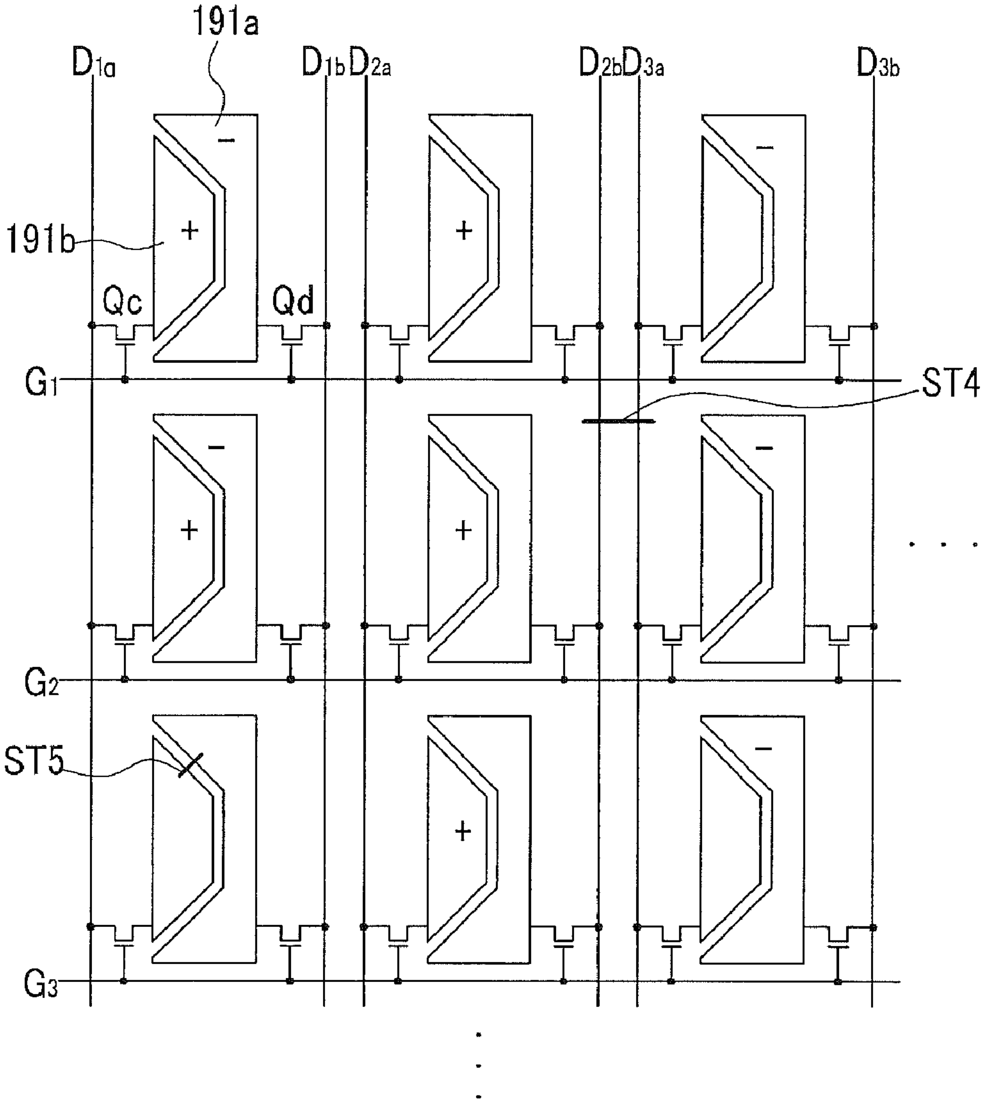
FIG. 22 illustrates the polarities of exemplary pixels of another exemplary embodiment of an LCD according to the present invention.

FIG. 21 is an exemplary test waveform diagram for another exemplary embodiment of an LCD according to the present invention, and FIG. 22 illustrates the pixel polarities of another exemplary embodiment of an LCD according to the present invention.

As shown in FIG. 21, a gate test signal Vg is applied to a gate shorting bar 320 with a cycle of T6. A positive data voltage V+ is applied to a first data shorting bar 310*a*, and a negative data voltage V− is applied to a second data shorting bar 310*b*. The dimensions of the positive and negative data voltages V+ and V− are equal to each other, or at least substantially the same. In other words, the positive and negative data voltages V+ and V− each have the same, or at least substantially the same, amount of deviation from the common voltage Vcom. With the application of the gate test signal Vg, the switching elements Qc and Qd turn on so that a positive pixel voltage is charged at a first sub-pixel electrode 191*a*, and a negative pixel voltage is charged at a second sub-pixel electrode 191*b*. The positive and negative pixel voltages are continuously sustained at the first and second sub-pixel electrodes 191*a* and 191*b*.

However, as shown in FIG. 22, in the case that a bridge ST4 is formed between the data lines D2*b* and D3*a*, a voltage $V_{PST4}$ (for example, a common voltage) that is smaller than the positive and negative data voltages V+ and V− is applied to the first and second sub-pixel electrodes connected thereto. That is, the sub-pixel electrodes connected to the data lines D2*b* and D3*a* are applied with the voltage $V_{PST4}$, such as the common voltage, which has a smaller dimension than the positive and negative data voltages V+ and V− because it does not deviate from the common voltage as much, if at all, as the positive and negative data voltages V+ and V− deviate from the common voltage. Accordingly, the bridge between the first and second data lines 171*a* and 171*b* can be easily identified by detecting the pixel column with a brightness different from that of the neighboring column through the VI test.

Furthermore, even when a bridge ST5 is formed between the first and second sub-pixel electrodes 191*a* and 191*b*, a voltage $V_{PST5}$ that is smaller than the positive and negative data voltages V+ and V− is charged at the sub-pixel electrodes. Accordingly, the bridge between the first and second sub-pixel electrodes 191*a* and 191*b* can be easily identified by detecting the pixel with a brightness different from that of the neighboring pixel through the VI test.

As described above, with the inventive structure, the gate lines connected to the respective sub-pixels are connected to two or four gate shorting bars, and the array test and the VI test are done. In this way, a bridge between respective sub-pixel electrode neighbors can be easily detected.

Furthermore, the data lines connected to the respective sub-pixels are connected to two data shorting bars, and the VI test is done. In this way, a bridge between respective data line neighbors and a bridge between respective sub-pixel electrode neighbors can be easily detected.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. A method of testing a liquid crystal display including a plurality of pixel electrodes having first and second sub-pixel electrodes, first and second switching elements connected to the first and second sub-pixel electrodes, respectively, first and second gate lines connected to the first and second switching elements, respectively, and a data line connected to the first and second switching elements, the method comprising:

providing first and second gate shorting bars connected to the first and second gate lines, respectively;

providing a data shorting bar connected to the data line;

applying a positive data voltage to the data shorting bar;

applying a first gate test signal to the first gate shorting bar to apply the positive data voltage to the first sub-pixel electrode;

applying a negative data voltage to the data shorting bar; and applying a second gate test signal to the second gate shorting bar to apply the negative data voltage to the second sub-pixel electrode.

2. The method of claim 1, further comprising detecting polarities of the first and second sub-pixel electrodes.

3. The method of claim 2, wherein detecting polarities of the first and second sub-pixel electrodes includes performing an array test.

4. The method of claim 1, further comprising identifying existence of a bridge between the first and second sub-pixel electrodes.

5. The method of claim 4, wherein positive and negative pixel voltages of the first and second sub-pixel electrodes having a bridge are not continuously sustained under application of positive and negative data voltages.

6. The method of claim 1, wherein the positive and negative data voltages have substantially same dimensions.

7. The method of claim 6, further comprising detecting uniformity of luminance of the liquid crystal display.

8. The method of claim 7, wherein detecting uniformity of luminance includes performing a visual inspection test.

9. The method of claim 7, further comprising identifying existence of a bridge between the first and second sub-pixel electrodes when brightness of a pixel having the first and second sub-pixel electrodes with a bridge is differentiated in brightness from other pixels not having a bridge.

10. The method of claim 7, further comprising identifying existence of a bridge between the first sub-pixel electrode and a shielding electrode.

11. The method of claim 1, further comprising separating the first and second gate shorting bars from the first and second gate lines, and separating the data shorting bar from the data line.

12. A method of testing a liquid crystal display including a plurality of pixel electrodes having first and second sub-pixel electrodes, first and second switching elements connected to the first and second sub-pixel electrodes, respectively, first and second gate lines connected to the first and second switching elements, respectively, and a data line connected to the first and second switching elements, the method comprising:

providing first and second gate shorting bars connected to the first and second gate lines at odd-numbered pixel rows, respectively;

providing third and fourth gate shorting bars connected to the first and second gate lines at even-numbered pixel rows, respectively;

providing a data shorting bar connected to the data line;

applying a positive data voltage to the data shorting bar;

applying a first gate test signal to the first gate shorting bar to apply the positive data voltage to the first sub-pixel electrode at the odd-numbered pixel rows;

applying a negative data voltage to the data shorting bar;

applying second and third gate test signals to the second and third gate shorting bars to apply the negative data voltage to the second sub-pixel electrode at the odd-numbered pixel rows and to the first sub-pixel electrode at the even-numbered pixel rows; and applying a fourth gate test signal to the fourth gate shorting bar to apply the positive data voltage to the second sub-pixel electrode at the even-numbered pixel rows.

13. The method of claim 12, further comprising detecting polarities of the first and second sub-pixel electrodes.

14. The method of claim 12, further comprising identifying existence of a bridge between the first and second sub-pixel electrodes.

15. The method of claim 12, further comprising identifying existence of a bridge between the first sub-pixel electrodes of adjacent pixels.

16. The method of claim 12, wherein the positive and negative data voltages have substantially same dimensions.

17. The method of claim 16, further comprising detecting uniformity of luminance of the liquid crystal display.

18. The method of claim 12, further comprising separating the first and second gate shorting bars from the first and second gate lines at the odd-numbered pixel rows; separating the third and fourth gate shorting bars from the first and second gate lines at the even-numbered pixel rows; and separating the data shorting bars from the data line.

19. A method of testing a liquid crystal display including a plurality of pixel electrodes having first and second sub-pixel electrodes, first and second switching elements connected to the first and second sub-pixel electrodes, respectively, a gate line connected to the first and second switching elements, and first and second data lines connected to the first and second switching elements, respectively, the method comprising:

providing first and second data shorting bars connected to the first and second data lines;

providing a gate shorting bar connected to the gate line;

applying a positive data voltage to the first data shorting bar;

applying a negative data voltage to the second data shorting bar; and applying a gate test signal to the gate shorting bar to apply the positive data voltage to the first sub-pixel electrode and to apply the negative data voltage to the second sub-pixel electrode.

20. The method of claim 19, further comprising detecting uniformity of luminance of the liquid crystal display.

21. The method of claim 19, further comprising identifying existence of a bridge between the first and second data lines.

22. The method of claim 19, further comprising identifying existence of a bridge between the first and second sub-pixel electrodes.

23. The method of claim 19, wherein the positive and negative data voltages have substantially same dimension.

24. The method of claim 19, further comprising separating the first and second data shorting bars from the first and second data lines, and separating the gate shorting bar from the gate line.

* * * * *